United States Patent

Ringland et al.

[15] 3,641,467
[45] Feb. 8, 1972

[54] ROTARY INDUCTOR

[72] Inventors: William L. Ringland, Greendale; Ernest K. Kaeser, West Allis, both of Wis.

[73] Assignee: Allis-Chalmers Manufacturing Company, Milwaukee, Wis.

[22] Filed: May 13, 1969

[21] Appl. No.: 824,176

[52] U.S. Cl. .................................. 336/5, 318/661, 336/135
[51] Int. Cl. ............................... H01f 33/00, H01f 21/06
[58] Field of Search ................... 336/130, 132, 134, 135, 5,
336/10, 12; 323/51; 310/129; 318/661

[56] References Cited

UNITED STATES PATENTS

| | | | |
|---|---|---|---|
| 1,989,172 | 1/1935 | Markley | 336/135 X |
| 2,488,734 | 11/1949 | Mueller | 336/135 |
| 2,644,916 | 7/1953 | Alexanderson | 336/135 X |
| 2,842,749 | 7/1958 | Bonnell | 336/135 |
| 2,864,066 | 12/1958 | Egbert et al. | 336/134 |
| 2,909,739 | 10/1959 | Cherniak | 336/135 X |
| 3,032,730 | 5/1962 | Swainson | 336/135 X |
| 3,041,486 | 6/1962 | Moffitt | 336/135 X |
| 3,085,192 | 4/1963 | Maier | 336/135 X |
| 3,281,655 | 10/1966 | Blasingame | 323/51 |
| 3,323,040 | 5/1967 | Wright | 323/51 |
| 3,398,386 | 8/1968 | Summerlin | 336/135 |

*Primary Examiner*—Thomas J. Kozma
*Attorney*—Lee H. Kaiser, Robert B. Benson and Thomas F. Kirby

[57] ABSTRACT

A rotary inductor has an annular stator with angularly displaced radial teeth, an energizing winding having turns encircling individual teeth to induce magnetic fluxes therein, an output winding having turns encircling individual teeth preferably displaced 180 electrical degrees apart connected in subtractive relation to cancel the base component of the magnetic flux, and a ferromagnetic rotor rotatable within the stator to cyclically modulate the permeances of the flux paths extending through the teeth and across the airgap into the rotor and thus cyclically vary the magnitude of the magnetic flux linking the turns of the energizing and output windings encircling each tooth. The preferred embodiment is a three-phase vector adder and has two energizing windings having turns surrounding sets of first and second teeth displaced 90 electrical degrees, three-phase output winding each of which has turns surrounding individual first teeth and second teeth, the three-phase output windings surrounding teeth displaced 120 electrical degrees on the stator, and the rotor being contoured so that the permeances of the magnetic flux paths through the teeth and across the airgap into the rotor vary substantially sinusoidally.

22 Claims, 21 Drawing Figures

ROTARY INDUCTOR

This invention relates to rotary inductors commonly called "resolvers."

The term "rotary inductor" is conventionally used to connote a device on which the magnetic coupling between one or more stator coils and one or more rotor coils can be varied by the rotation of a shaft. Such devices may be used to transmit angular information or torque to a remote point, to modulate an electrical signal with mechanical information, or to demodulate an electrical signal, and the modulating information is presented in electrical or mechanical form. Usually the rotary inductor is similar to an induction regulator, and variable coupling is obtained by changing the relative orientation of the primary and secondary windings. In known rotary inductors the primary windings are wound on a laminated magnetic rotor, and the connections to the primary windings are brought out by flexible leads, if the rotor has limited rotation, or by slip rings and brushes if the rotor is free to rotate continuously.

It is an object of the invention to provide an improved rotary inductor which eliminates the slip rings and brushes required in known devices to make connections to the windings.

It is an object of the preferred embodiment of the invention to provide an improved rotary inductor, vector adder which generates an output signal of selectively variable frequency, magnitude and phase.

It is a further object of the preferred embodiment of the invention to provide an improved rotary inductor, vector adder which generates a control signal for a variable speed synchronous motor which, after demodulation, is a replica in frequency, magnitude and phase of the desired terminal voltage to be applied to the motor.

These and other objects and advantages of the invention will be more readily apparent from the following detailed description when considered in conjunction with the accompanying drawings wherein.

Figure 4:
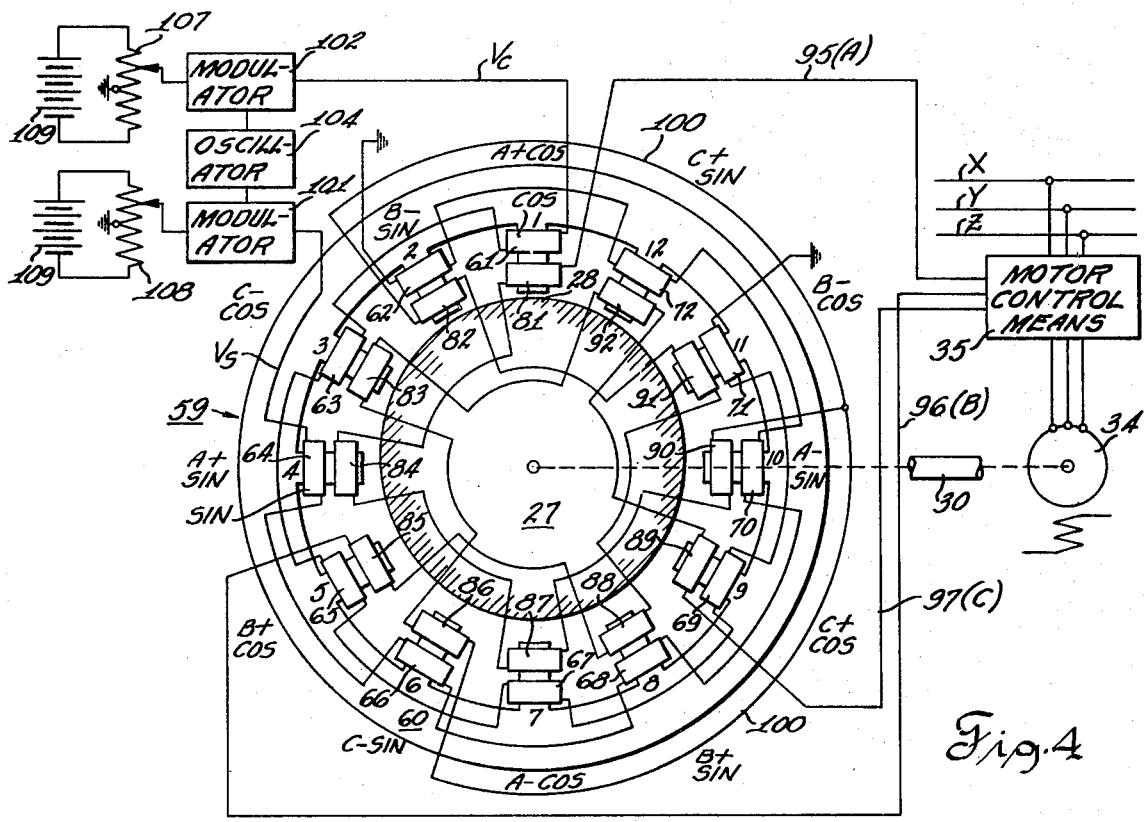
FIG. 4 is a schematic diagram of a three phase, rotary inductor, vector adder embodying the invention.
Figure 7:
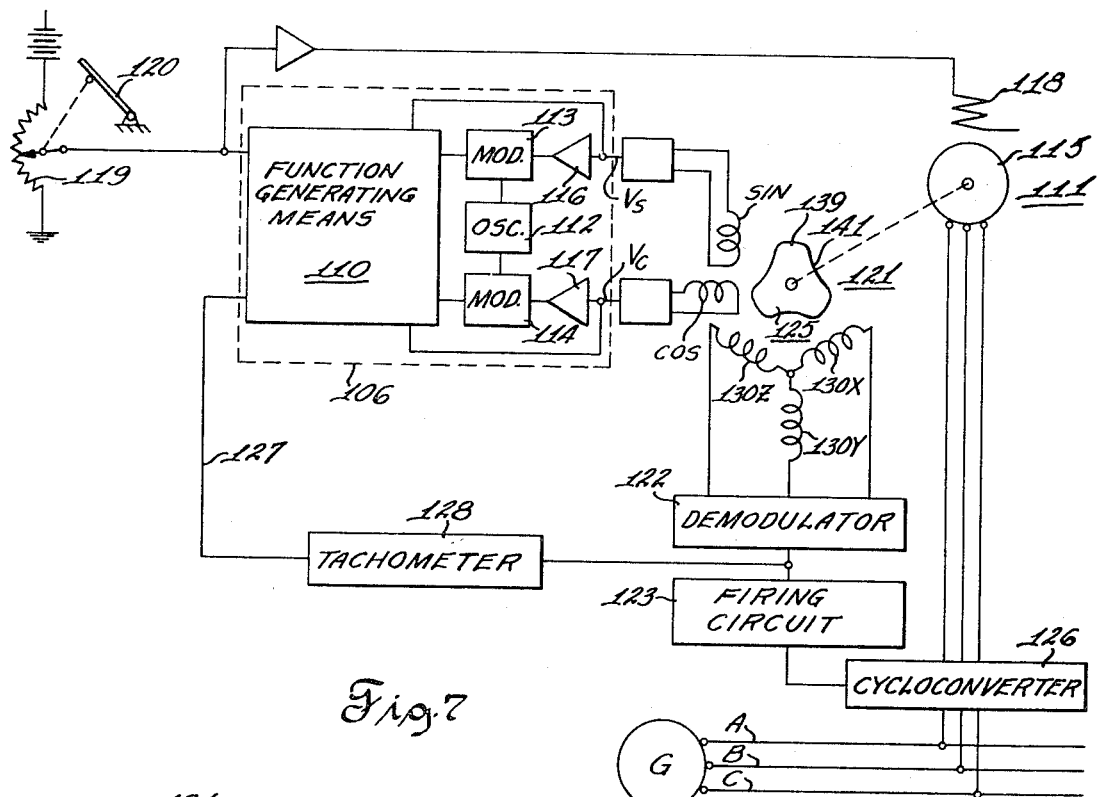
Figure 16:
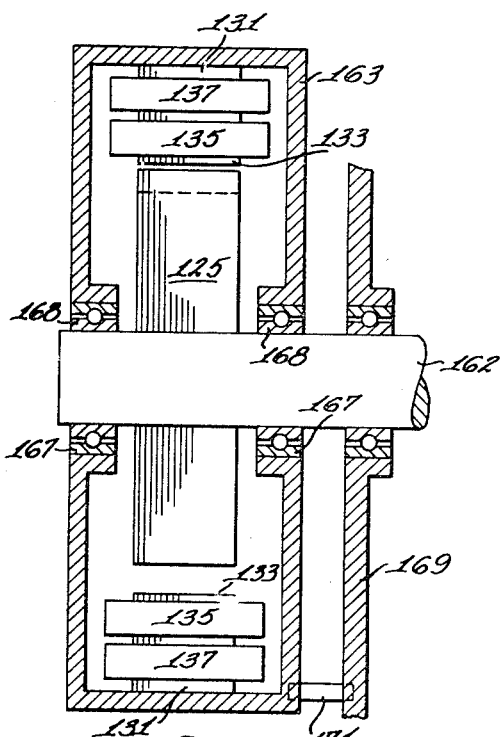
Figure 15:
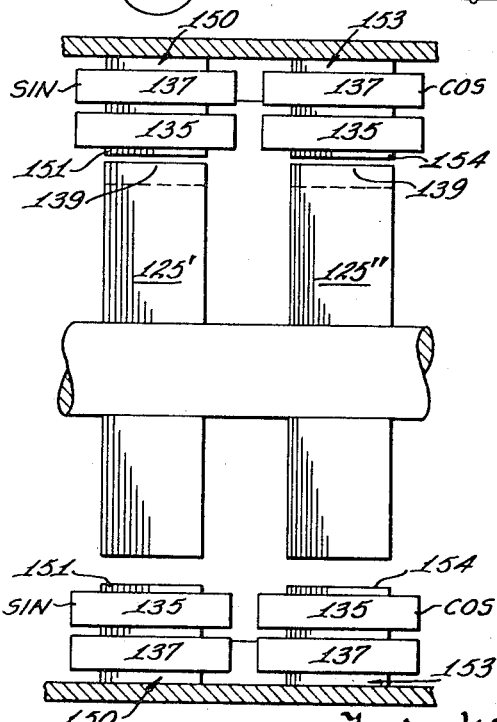
Figure 8:
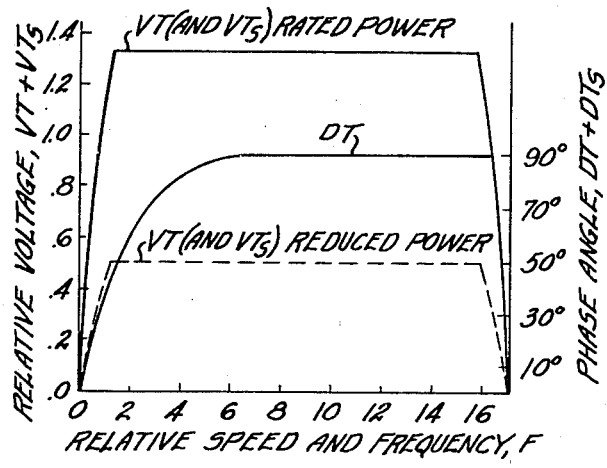
Figure 9:
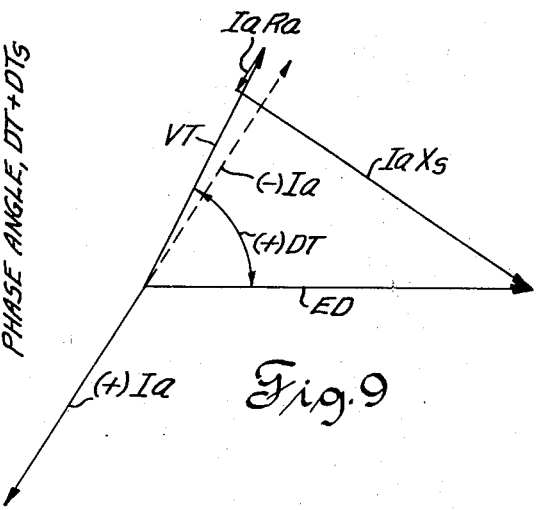
Figure 10:
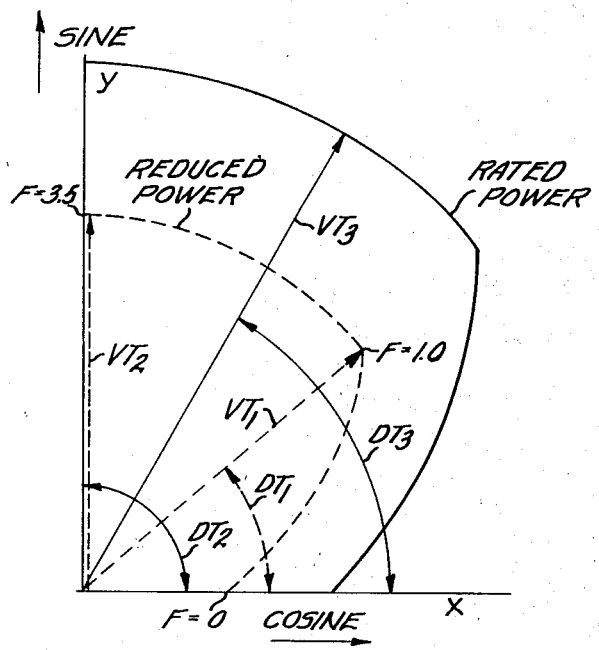
Figures 11, 12:
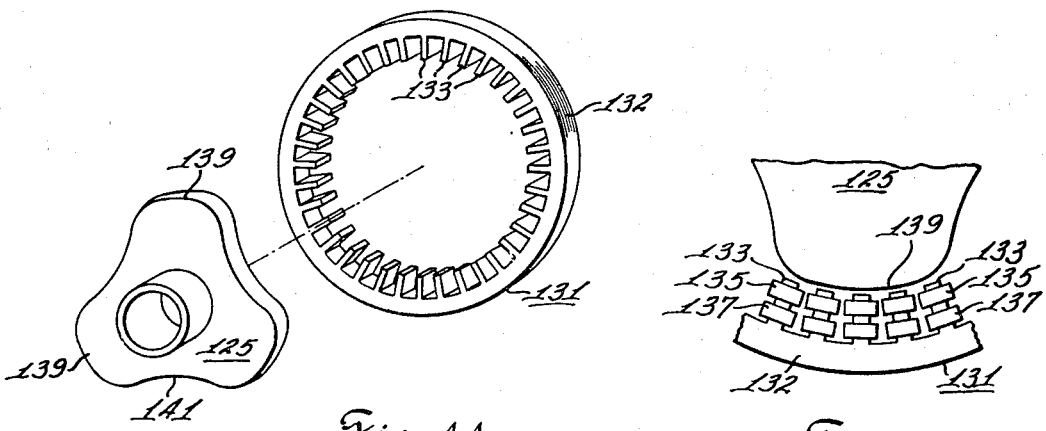
Figure 14:
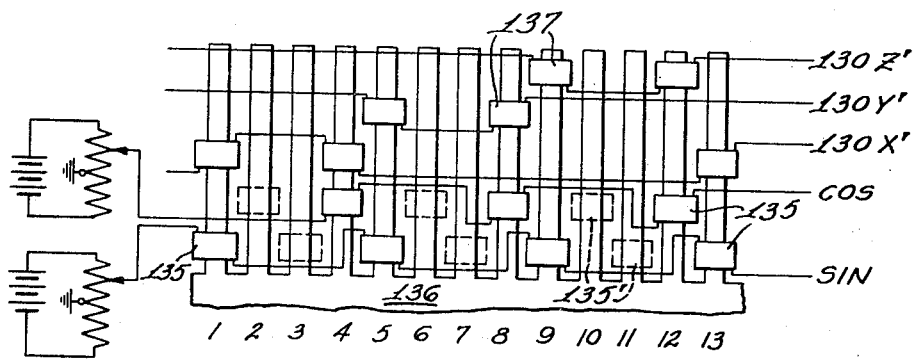
Figure 13:
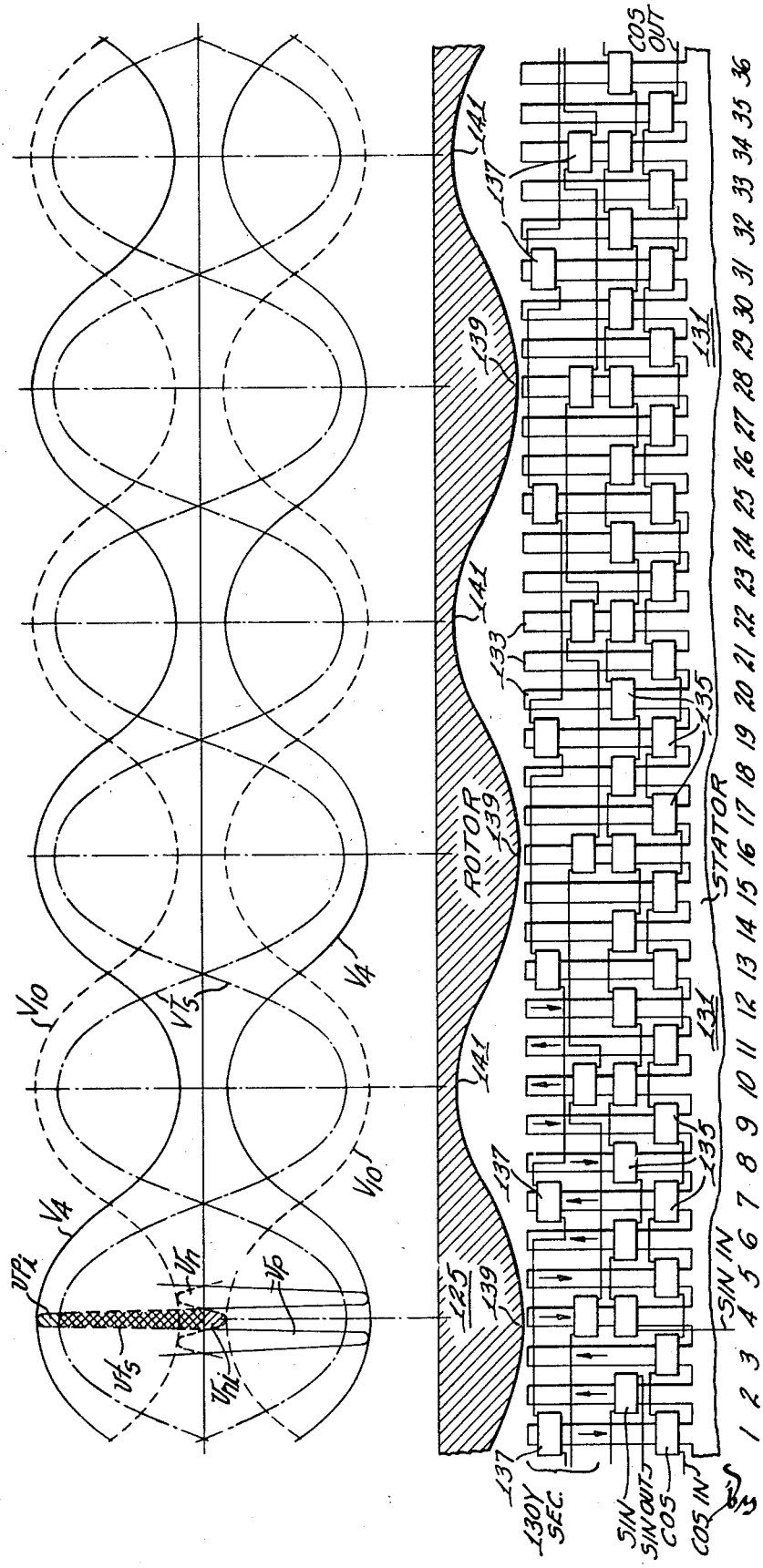
Figure 17:
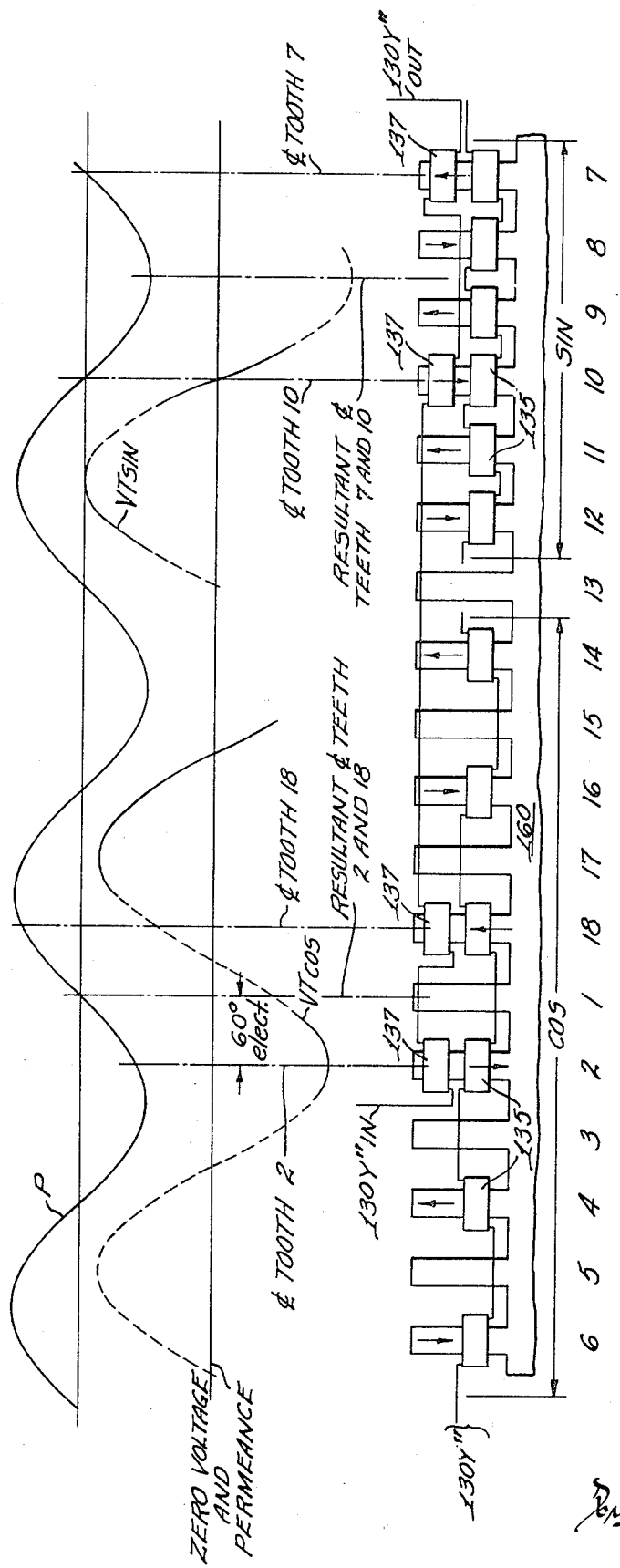
Figure 18:
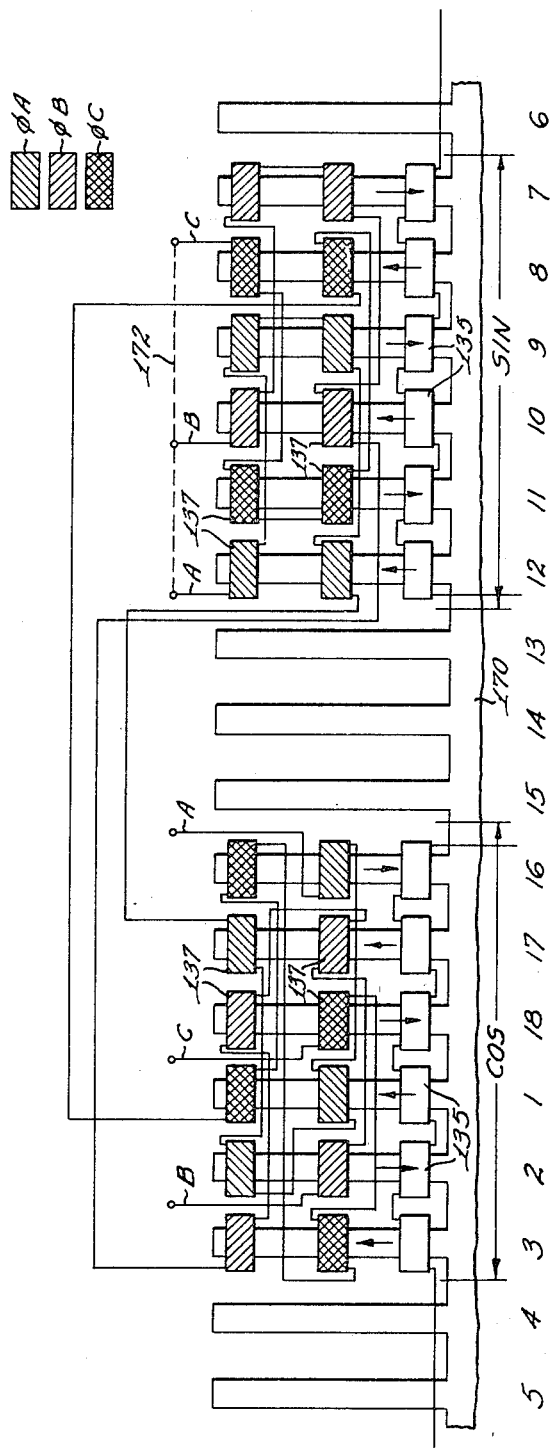

FIGS. 6a, 6b, 6c, and 6d illustrate vector addition accomplished by the embodiment of FIG. 4;

FIG. 7 is a schematic block diagram of an adjustable speed synchronous motor system incorporating a preferred three-phase, three pole-pair, rotary inductor, vector adder embodiment of the invention;

FIG. 8 is a graph plotting motor terminal voltage and displacement angle versus motor speed required to provide maximum rated power over the speed range of the motor system shown in FIG. 7;

FIG. 9 shows the vector diagram for the motor shown in FIG. 7;

FIG. 10 shows curves plotting as polar coordinates the variation in motor terminal voltage and displacement angle with motor speed shown in FIG. 8;

FIG. 11 is a perspective view of the stator and rotor of the preferred embodiment of vector adder incorporated in FIG. 7;

FIG. 12 is a partial front view of the rotor and stator shown in FIG. 11;

FIG. 13 is a planar development of the rotor and stator of the preferred vector adder embodiment of the invention shown in FIG. 7 (only one secondary phase winding being shown) and also illustrates the voltages generated in the output windings;

FIG. 14 is a planar development of one pole-pair of a rotary inductor vector adder embodiment of the invention having DC excitation;

FIG. 15 is a sectional view taken diametrically through a rotary inductor, vector adder embodiment of the invention which minimizes mutual influence between the two energizing windings;

FIG. 16 is a sectional view taken diametrically through a rotary inductor, vector adder embodiment of the invention which is exceptionally compact and has a high degree of concentricity between rotor and stator; and FIGS. 17 and 18 are schematic planar developments of the stator of alternative rotary inductor, vector adder embodiments of the invention, the former showing only one secondary phase winding and illustrating the voltages induced in the output winding coils linked by the sine energizing winding and by the cosine energizing winding.

Figure 1:
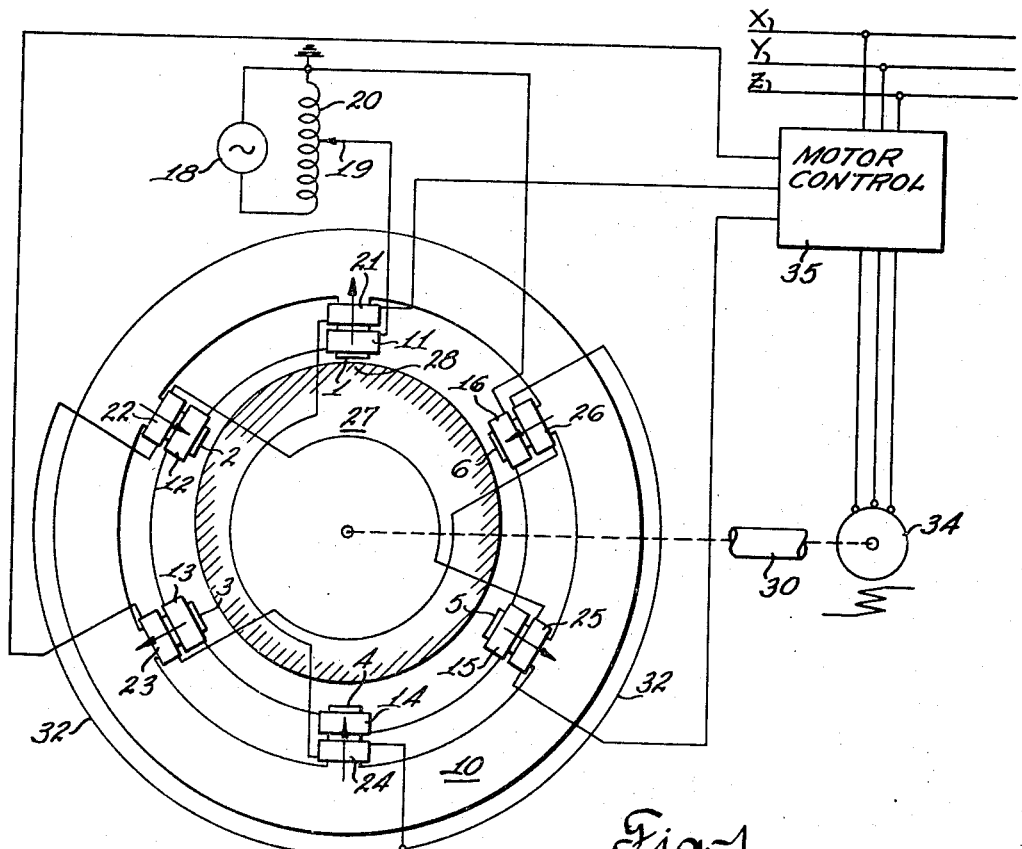
FIG. 1 is a schematic diagram of a polyphase rotary inductor embodying the invention.

Referring to FIG. 1 of the drawing, a three-phase rotary inductor with high frequency excitation embodying the invention has an annular ferromagnetic stator 10, which may be constructed of stacked silicon steel laminations or of powdered magnetic material such as "ferrite," provided with six radially inward extending teeth 1, 2, 3, 4, 5, and 6 displaced 60° apart. A primary, or energizing winding includes six serially connected coils 11, 12, 13, 14, 15 and 16 wound to encircle teeth 1, 2, 3, 4, 5, and 6 respectively so that magnetic flux is generated in opposite directions in successive teeth. The energizing winding may be excited from an alternating current source 18 having a relatively high frequency, for example, 10 kilocycles, connected across an autotransformer 20 having a variable tap 19 to permit selective variation of the magnitude of the exciting voltage. A ferromagnetic rotor 27, which may be constructed of stacked silicon steel laminations or of powdered magnetic material such as ferrite, is rotatable within stator 10 and is provided with a single radially projecting lobe 28 and has varying airgap spacing from teeth 1–6, for example, the smallest airgap spacing is from tooth 1 at the rotor position illustrated in FIG. 1.

The magnetic fluxes induced in teeth 1–6 by coils 11–16 flow in flux paths through the teeth and across the airgap into rotor 27 and return through the stator 10. The primary winding coils 11–16 are positioned near the airgap on each tooth to control the magnetic fringe influence. The magnetic fluxes flow in opposite directions in successive teeth because the energizing winding coils 11–16 on successive teeth are wound, or are connected, in opposite directions and the words "-wound" and "connected" are used alternatively hereinafter to connote a coil arrangement which so generates the magnetic fluxes in opposite directions in successive teeth. For convenience of description teeth 1, 3 and 5 are arbitrarily termed "positive" teeth and the direction of magnetic flux generated therein is shown by radially outward arrows in FIG. 1, and teeth 2, 4 and 6 are termed "negative" teeth and the direction of magnetic flux flow therein is shown by radially inward arrows. Considering such positive and negative directions of magnetic flux flow, the sum of the fluxes (although varying in each tooth) must be zero in total, or stated another way, the sum of the positive fluxes must equal the sum of the negative fluxes.

The rotary inductor has a pair of diametrically opposed teeth associated with each phase, one tooth of which is a positive tooth and the other is a negative tooth. The secondary winding for phase A has a coil 21 wound to encircle positive tooth 1 in the same direction as primary coil 11, connected in series with a coil 24 wound to encircle negative tooth 4 in the direction opposite from primary coil 14 so that the voltages induced in coils 21 and 24 subtract in relation to the instantaneous flux directions. The secondary winding for phase B has a coil 23 wound to encircle positive tooth 3 in the same direction as primary coil 13, connected in series with a coil 26 wound on negative tooth 6 in the direction opposite from primary coil 16 so that the voltages induced in coils 23 and 26 subtract. The secondary winding for phase C has a coil 25 wound to encircle positive tooth 5 in the same direction as primary coil 15, connected in series with a coil 22 wound on negative tooth 2 in the direction opposite from primary coil 12 so that the voltages induced in coils 22 and 25 subtract.

When rotor 27 is at standstill, the primary winding coils 11–16 generate magnetic fluxes of fixed magnitude in teeth 1–6 which inductively link the secondary coils 21–26 respectively and induce fixed magnitude signals therein at the frequency of AC source 18. The permeances of the paths for the magnetic fluxes generated by primary coils 11–16 in teeth 1–6, and thus the voltage levels of the fixed amplitude signals induced in the secondary coils 21–26, are functions of the position of rotor 27. Rotor 27 is preferably contoured so that the permeances of the magnetic flux paths through teeth 1–6 and across the airgaps into the rotor 27 vary sinusoidally over a constant "DC" or base flux, thereby sinusoidally varying the magnetic flux linking the two coils inductively coupled by each tooth, for example, primary coil 11 and secondary coil 21 of phase A, as rotor 27 rotates. Such sinusoidal variation of the permeances of the magnetic flux paths over a base flux assures that the current through the primary winding will be constant if the energizing voltage from tap 19 is constant and further it assures that the sum of the magnetic fluxes in the positive and negative teeth is zero at all positions of rotor 27. This follows since if the permeances of the magnetic flux paths through teeth 1–6 vary sinusoidally in relation to a base flux, the sum of the inductive reactances of the primary coils 11–16 will be a constant and consequently the primary current will remain constant. It will be appreciated that a pure sinusoid is the optimum but is difficult to accomplish, and the phrase "substantially sinusoidal" is used hereinafter in the specification and the claims to also cover approximately sinusoidal waves which deviate from the pure sinusoidal form but do not result in serious deficiencies in performance of the system. Sinusoidal variation of permeances (which are the reciprocals of the reluctances) of the flux paths through teeth 1–6 will result if rotor 27 is contoured as shown to have sinusoidal variation of the airgap spacings to teeth 1–6, but it also may be accomplished by a circular rotor having portions of different permeability (not shown) or by a rotor having segmented laminations skewed relative to each other (not shown).

FIG. 1 shows rotor 27 coupled to a rotatable shaft 30. When shaft 30 turns, the voltages induced in secondary coils 21–26 are no longer fixed in amplitude but rather have a sinusoidal modulation at a frequency which is a function of the angular velocity of shaft 30.

Figure 2:
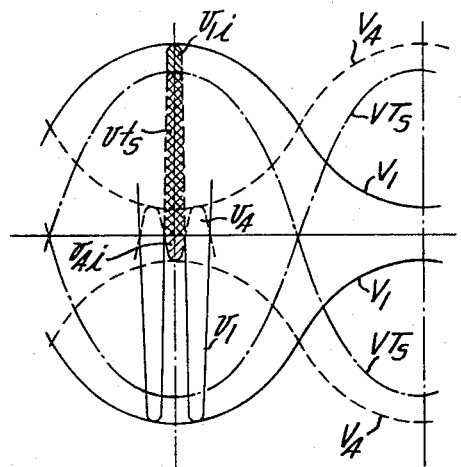
FIG. 2 is a planar development of the rotor and stator of the rotary inductor embodiment of FIG. 1 (only one secondary phase winding being shown) and also illustrates the voltages induced in the output windings.
Figure 2:
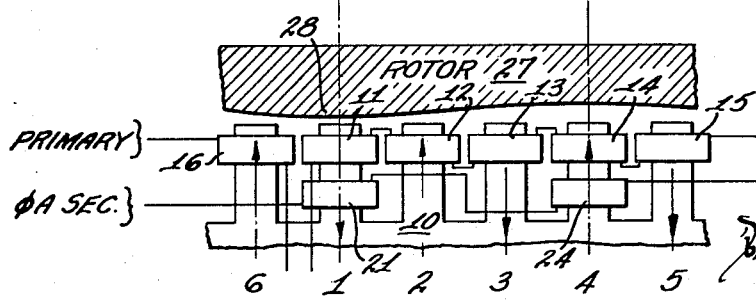

FIG. 2 schematically illustrates in full lines the sinusoidal modulation envelope $V_i$ of the instantaneous high frequency voltages $v_1$ induced in coil 21 on positive tooth 1 as rotor 27 turns and moves lobe 28 past teeth 1–6. Several cycles of the high frequency voltage $v_1$ induced in coil 21 on tooth 1 are shown above this tooth. As illustrated in FIG. 2, the lobe 28 of rotor 27 is opposite tooth 1, and consequently the permeance of the flux path through this tooth is a maximum at the rotor position shown, and further the amplitude of the modulation envelope $V_1$ of the high frequency voltages $v_1$ induced in the coil 21 on tooth 1 is a maximum.

FIG. 2 also illustrates in dotted lines the sinusoidal modulation envelope $V_4$ of the high frequency voltages $v_4$ induced in coil 24 on negative tooth 4 as lobe 28 on revolving rotor 27 moves past this tooth. At the rotor position illustrated in FIG. 2, the rotor 27 has the largest airgap spacing from tooth 4, and consequently the permeance of the flux path through this tooth is a minimum and the amplitude of the modulation envelope $V_4$ of the high frequency signals $v_4$ induced in coil 24 is a minimum at the rotor position shown. Several cycles of the high frequency voltages $v_4$ induced in coil 24 on negative tooth 4 at the illustrated rotor position are shown in FIG. 2, and it will be noted that they are 180° out of phase from and subtract from the voltages $v_1$ induced in coil 21 on positive tooth 1. It will be appreciated that the magnitude of the voltage shown by the $V_4$ envelope directly opposite tooth 4 only represents the magnitude of the high frequency voltage $v_4$ induced in coil 24 after 180 additional degrees of rotor rotation from the position shown to the position wherein lobe 28 is opposite tooth 4.

FIG. 2 of the drawing further illustrates, in cross hatching, one-half cycle of instantaneous voltage $v_{4i}$ induced in coil 24 on negative tooth 4 which is opposed to and subtracts from one-half cycle of instantaneous voltage $v_{1i}$ (shown in the opposite hatching) induced in coil 21 in positive tooth 1 to produce the resultant half cycle of phase A secondary output voltage $vt_s$ shown in checked hatching. This figure also shows the modulation envelope $VT_s$ of the resultant phase A secondary winding high frequency output voltages $vt_s$ in dot-dash lines.

The sinusoidal flux modulation produced by rotor 27 is at the frequency of rotation of shaft 30 and is superimposed upon a "base" or average flux, i.e., the base flux when subtracted from the total flux results in the pure sinusoidal flux. The phrase "vary sinusoidally" is used hereinafter in the specification and claims to connote variation over such base flux. The connection of secondary winding coil 21 on positive tooth 1 in series with, but in opposition to, secondary winding 24 on negative tooth 4 nullifies the effect of such base flux.

The secondary windings for phases A, B, and C are preferably connected in wye by a lead 32 (see FIG. 1) which is connected to one end of each of the secondary coils 22, 24 and 26 on negative teeth 2, 4, and 6. Voltages similar to those illustrated in FIG. 2 are also induced in secondary winding coils 23, 26 and 25, 22 of phases B and C. The output voltages from the phases A, B and C secondary windings are displaced 120° from each other because of the physical location of the secondary coils for the three phases on stator 10. FIG. 1 schematically illustrates that shaft 30 is driven by a synchronous motor 34 and that the secondary phase coils 21, 23 and 25 of the secondary windings for phases A, B and C of the rotary inductor are coupled to a motor control 35 (shown only in block form) for motor 34. Control 35 may be a frequency changer or cycloconverter (not shown) having thyristors which control, or regulate the delivery of electrical power from phase busses X, Y and Z to motor 34 as a function of the output signals $VT_s$ from the rotary inductor. The high frequency output signals $vt_s$ from the rotary inductor secondary phase windings are modulated at a frequency which is a function of the speed of rotor 27 and their magnitude may be selectively varied by the adjustable tap 19 on autotransformer 20 to change the number of ampere turns of energizing coils 11–16 and thus vary the magnitude of the secondary winding phase voltages $vt_s$ and $VT_s$. It will thus be appreciated that the disclosed rotary inductor provides a three-phase output signal the frequency of whose modulation envelope is a function of motor speed and whose magnitude is selectively variable and which is suitable for regulating motor control means 35 such as a frequency changer. The term "output signal" is used in the alternative hereinafter to refer to the high frequency signal $vt_s$ or to its envelope after demodulation to remove the carrier frequency and alternate half waves.

The magnitude of the instantaneous voltages $v_1$, $v_4$ and $vt_s$ are given in FIG. 2 on the moving centerline of the lobe 28. Assuming that rotor 27 revolves at constant speed, these voltages occur at fixed time intervals. Such voltages could be made to occur earlier or later by angularly shifting the stator 10 and thus accomplish a phase shift of the signals relative to rotor 10. Such phase shift can be effected by a rotatable stator that is moved by mechanical means. FIGS. 4–18 disclose embodiments of the invention which accomplish such phase shift without rotating the stator.

In all embodiments of the invention, the wire leads to the primary winding and to the secondary winding, are looped back so that the circuits do not encircle the shaft 30 supporting rotor 27, thereby preventing the generation of magnetic flux in an axial direction which might cause disturbing additional reactances in the circuits.

Figure 3:
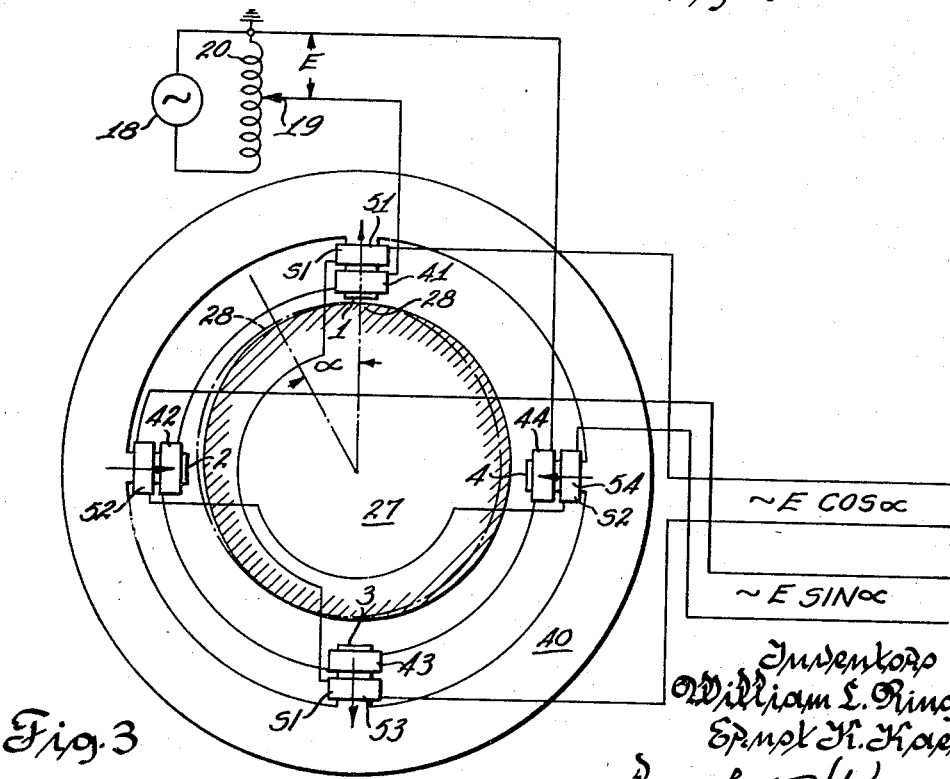
FIG. 3 is a schematic diagram of a single phase, rotary inductor, vector resolver embodying the invention.

FIG. 3 illustrates a single-phase rotary inductor, vector resolver embodying the invention adapted to resolve polar coordinates into vectors along two perpendicular axes. The radius vector polar coordinate may be the excitation voltage magnitude and the vectorial angle polar coordinate may be the relative angle between stator and rotor.

An annular ferromagnetic stator 40, constructed of silicon steel laminations or of powdered magnetic material such as ferrite, has four radially inward extending teeth 1, 2, 3 and 4. An energizing, or primary winding has serially connected coils 41, 42, 43 and 44 surrounding teeth 1, 2, 3 and 4 respectively with coils on diametrically opposed teeth wound in the same direction so that teeth 1 and 3 are positive teeth (designated by radially outward arrows arbitrarily indicating direction of magnetic flux flow) and teeth 2 and 4 are negative teeth. The primary winding may be excited with an alternating signal of selectively variable magnitude from the adjustable tap 19 of an autotransformer 20 connected across a suitable alternating current source 18.

A ferromagnetic rotor 27 has a radially extending lobe 28 and has limited rotation within stator 40. The magnetic fluxes generated by primary winding coils 41–44 in teeth 1–4 flow across the airgaps into rotor 27 and returns by stator 40. One secondary winding S1 has a pair of serially connected coils 51 and 53 wound to encircle positive teeth 1 and 3 in the same direction as primary winding coils 41 and 43 respectively so that the magnetic fluxes flow in opposite directions through coils 51 and 53, thereby connecting these coils in subtractive relation and cancelling the base component of the magnetic flux. Another secondary winding S2 has a pair of serially connected coils 52 and 54 wound to encircle negative teeth 2 and 4 in the same direction as primary coils 42 and 44 respectively, thereby connecting coils 52 and 54 in series opposition to cancel the base component of the flux.

Rotor 27 is preferably contoured so that the permeances of the magnetic flux paths through teeth 1–4 and across the airgaps into rotor 27 vary sinusoidally over a constant base flux. Such sinusoidal variation of the permeances over a base flux assures that the current through the primary winding is constant for a given excitation voltage E derived at tap 19 and that the sum of the positive and negative fluxes through teeth 1–4 is zero at all positions of rotor 27.

The permeance of the magnetic flux path through each tooth 1–4 is a function of the position of rotor 27 and is a minimum when lobe 28 is opposite a given tooth. When lobe 28 is opposite tooth 1 as shown in FIG. 3, the permeance of the magnetic flux path through tooth 1 is a maximum and that through tooth 3 is a minimum. The secondary coils 51 and 53 are opposed, and consequently a maximum signal is generated in secondary winding S1. The permeances of the flux paths through teeth 2 and 4 are equal at this position of rotor 27, and equal and opposite signals are induced in secondary coils 52 and 54, so zero resultant signal is derived by secondary winding S2.

When rotor lobe 28 is opposite tooth 2, zero signal is induced in secondary winding S1 comprised of coils 51 and 53 on teeth 1 and 3, while a maximum signal is induced in secondary winding S2 comprising serially connected coils 52 and 54 on teeth 2 and 4. Since rotor 27 sinusoidally varies the permeances of the paths for magnetic flux generated in stator teeth 1–4, the magnitudes of the resultant signals induced in secondary windings S1 and S2 are functions of the angle $\alpha$ between stator 40 and lobe 28 of rotor 27 (shown relative to the dot-dash line position of rotor 27 in FIG. 3).

The resultant voltages induced in secondary windings S1 and S2 are representative of the cosine and sine respectively of the angle $\alpha$ between stator 40 and lobe 28 on rotor 27. Further, the magnitude of the excitation voltage impressed on the energizing winding may be selectively varied by adjusting tap 19, thereby changing the ampere turns of coils 41–44 and the magnitude of the signals induced in secondary windings S1 and S2.

The output voltages from windings S1 and S2 may be transmitted electrically to control a synchro motor (not shown), and it will be appreciated that this embodiment of the invention can be considered as a coordinate transformer since it transforms polar coordinates, i.e., excitation voltage magnitude and relative angle $\alpha$ between stator and rotor, into rectangular coordinates. If the voltage from tap 19 exciting the primary winding is designated E, the output voltages generated in windings S1 and S2 are functions of $E \cos \alpha$ and $E \sin \alpha$ respectively as represented in FIG. 3.

FIG. 4 illustrates a three phase rotary inductor, vector adder 59 embodying the invention which vectorially adds two signals representative of the rectangular coordinates of a curve and generates an output signal of selectively variable frequency whose magnitude and phase angle are the polar coordinates of the curve. Vector adder 59 has an annular ferromagnetic stator 60 preferably constructed of stacked silicon steel laminations or powdered magnetic material such as ferrite and provided with 12 radially inward extending teeth 1 through 12. The six odd-numbered teeth 1, 3, 5, 7, 9 and 11 may be associated with one primary, or energizing winding COS termed the "cosine" winding, and a pair of diametrically opposed, odd-numbered teeth are associated with each phase, i.e., positive tooth 1 and negative tooth 7 with phase A; positive tooth 5 and negative tooth 11 with phase B; and positive tooth 9 and negative tooth 3 with phase C. Energizing, or primary winding COS comprises six serially connected coils 61, 63, 65, 67, 69, and 71 surrounding teeth 1, 3, 5, 7, 9 and 11 respectively with successive coils wound in opposite directions so that teeth 1, 5 and 9 are positive teeth and teeth 3, 7 and 11 are negative teeth.

The six even-numbered teeth 2, 4, 6, 8, 10 and 12 are associated with the primary, or energizing winding SIN, termed the "sine" winding, and a pair of diametrically opposed, even-numbered teeth are associated with each phase, i.e., positive tooth 4 and negative tooth 10 with phase A; positive tooth 8 and negative tooth 2 with phase B; and positive tooth 12 and negative tooth 6 with phase C. Energizing, or primary winding SIN comprises six serially connected coils 64, 66, 68, 70, 72 and 62 surrounding teeth 4, 6, 8, 10, 12 and 2 respectively with successive coils wound or connected in opposite directions so that teeth 4, 8 and 12 are positive teeth and teeth 6, 10 and 2 are negative teeth.

Figure 5:
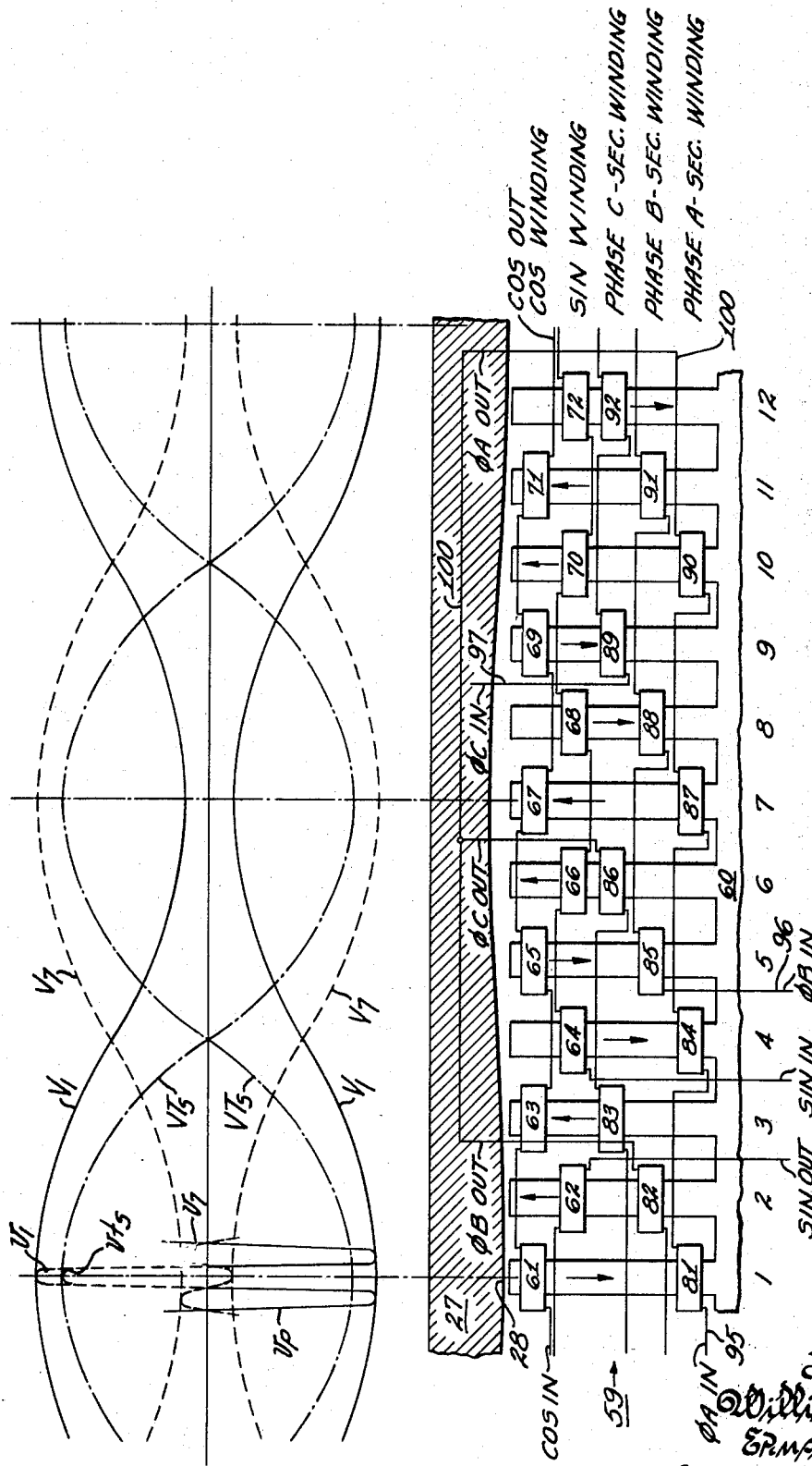
FIG. 5 is a planar development of the rotor and stator of the vector adder embodiment of FIG. 4.

The primary coils 61–72 are actually positioned on each tooth adjacent the airgap as shown in FIG. 5 to control the fringing flux and obtain close magnetic coupling between the primary excitation and secondary output coils on each tooth, but these coils are illustrated in FIG. 4 as being on the radially outer portion of each tooth in order to simplify the drawing.

The secondary, or output winding for each phase comprises two coils connected in series opposition wound on a pair of diametrically opposed, positive and negative odd-numbered teeth surrounded by COS winding coils, connected in series with two coils connected in series opposition and wound on a pair of diametrically opposed, positive and negative even-numbered teeth surrounded by SIN winding coils. For example, phase A secondary winding includes a coil 84 wound in surrounding relation to positive tooth 4 and in the same direction as SIN winding coil 64 connected in series with a coil 90 wound in surrounding relation to negative tooth 10 and in the opposite direction from SIN winding coil 70, and this pair of coils 84 and 90 is connected in series with a coil 81 wound in surrounding relation to positive tooth 1 in the same direction as COS winding coil 61 connected in series with a coil 87 wound in surrounding relation to negative tooth 7 and in the opposite direction from COS winding coil 67. Similarly phase B secondary winding includes a pair of coils 85 and 91 wound in series opposition on positive and negative teeth 5 and 11 carrying COS winding coils 65 and 71 connected in series with a pair of coils 88 and 82 wound in series opposition on positive and negative teeth 8 and 2 carrying SIN winding coils 68 and 62 respectively. Phase C secondary winding includes a pair of serially connected coils 89 and 83 wound in series opposition on positive and negative teeth 9 and 3 carrying COS winding coils 69 and 63 connected in series with a pair of subtractively energized coils 92 and 86 wound on positive and negative teeth 12 and 6 carrying SIN winding coils 72 and 66.

Ferromagnetic rotor 27 is contoured so that the permeances of the flux paths through teeth 1-12 vary sinusoidally over a constant base flux in a manner similar to the embodiment of FIG. 1 and is shown with lobe 28 opposite tooth 1. The embodiment of FIG. 4 may be considered to comprise two "arrangements" similar to the embodiment of FIG. 1 displaced 90° apart, i.e., one SIN winding "arrangement" similar to that of FIG. 1 displaced by 90° from a COS winding arrangement also similar to the embodiment of FIG. 1.

The three phase secondary windings are displaced 120° apart on stator 60, e.g., phase A secondary coils 81 and 87 on odd-numbered cosine teeth 1 and 7 are displaced 120 electrical degrees from phase B secondary coils 85 and 91 on odd-numbered cosine teeth 5 and 11 and also displaced 120° from phase C secondary coils 89 and 83 on odd-numbered cosine teeth 9 and 3, and similarly the phase A secondary coils 84 and 90 on even-numbered sine teeth 4 and 10 are displaced 120° from phase B secondary coils 88 and 82 on even-numbered sine teeth 8 and 2 and also displaced 120° from phase C secondary coils 92 and 86 on even-numbered sine teeth 12 and 6.

The secondary coils of each phase on even-numbered teeth carrying SIN coils are displaced 90° from the secondary coils of the same phase on odd-numbered teeth carrying COS coils, for example, phase A secondary coils 84 and 90 on sine teeth 4 and 10 are displaced 90° from phase A secondary coils 81 and 87 on odd-numbered cosine teeth 1 and 7. The three phase secondary windings may be connected in wye by a conductor 100 connected to one side of coils 82, 86, and 90 from phases B, C, and A respectively.

SIN and COS windings may be energized with selectively variable, in-phase signals from modulators 101 and 102 respectively (shown in block form in FIG. 4) both of which receive a high-frequency carrier signal from an alternating current source such as an oscillator 104 and modulate said high-frequency signal in accordance with selectively variable DC input signals. FIG. 4 schematically illustrates that such selectively variable DC signals may be derived from the movable taps of a pair of potentiometers 107 and 108 connected across batteries 109.

When rotor 27 is at standstill and modulators 101 and 102 energize the SIN and COS windings with fixed magnitude, inphase alternating signals, the ninety degree displaced SIN and COS windings (formed respectively by coils 62, 64, 66, 68, 70 and 72 and by coils 61, 63, 65, 67, 69 and 71) generate magnetic fluxes of constant intensities in teeth 1-12 which inductively link the three phase secondary windings A, B and C (formed respectively by coils 81, 84, 87, 90; coils 85, 88, 91, 82; and coils 89, 92, 83, 86) and induce fixed magnitude signals therein. The permeances of the paths for the magnetic fluxes generated by the SIN and COS windings, and the voltage level of the fixed magnitude signals induced in the three phase secondary windings is a function of the position of lobe 28 of rotor 27.

Assuming that the input signal to one energizing winding is zero, for example, to the SIN winding, and that a high frequency alternating signal is applied by modulator 102 to the COS energizing winding, several cycles of the peak instantaneous output voltages $v_1$ and $v_7$ induced in a pair of secondary phase coils on ODD-numbered teeth carrying COS coils (for example, in phase A secondary coils 81 and 87 on teeth 1 and 7 carrying COS winding coils 61 and 67) at the rotor position shown with lobe 28 opposite tooth 1 are represented opposite tooth 1 in FIG. 5 which is a planar development of stator 60 and rotor 27. This figure also shows the instantaneous resultant voltage $vt_s$ generated in the subtractively arranged phase A coils 81 and 87; the sinusoidal modulation envelopes $V_1$ and $V_7$ of voltages $v_1$ and $v_7$ induced in coils 81 and 87 as rotor 27 revolves; and the modulation envelope $VT_s$ of the high frequency output signal $vt_s$ from such pair of coils 81 and 87 (which also constitutes the output signal from the phase A secondary winding). At the rotor position shown in FIG. 5 wherein lobe 28 is opposite tooth 1, the permeance of the flux path through tooth 1 and the magnitude of the high-frequency voltage $v_1$ induced in coil 81 are maximum and the magnitude of the voltage $v_7$ induced in coil 87 on tooth 7 is a minimum.

If it now be assumed that the input signal to the COS winding is zero and that a high frequency signal is applied by modulator 101 to the SIN energizing winding, the peak amplitude of the output signal envelope $VT_s$ from phase A secondary winding (comprising coils 81, 84, 87, 90) will be shifted 90° to the right as seen IN FIG. 5 and occur when lobe 28 is opposite tooth 4 carrying SIN winding coil 64. If signals are applied to both SIN and COS windings by modulators 101 and 102, the peak amplitude of the phase A secondary winding output signal will occur at some point between teeth 1 and 4 when lobe is opposite such point and will be determined by the relative magnitude of the signals to the SIN and COS windings.

Figures 6A, 6B:
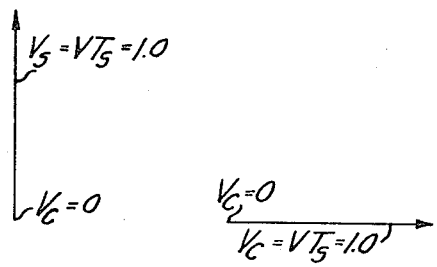

The magnitude of the signals $V_c$ and $V_s$ applied by modulators 102 and 101 to the COS and SIN energizing windings may be represented by the perpendicular vectors $V_c$ and $V_s$ shown in FIG. 6, and the magnitude of the resultant voltage induced in each secondary phase winding may be represented by the resultant vector $VT_s$ (since the magnitude of the modulation envelopes are directly proportional to the high frequency voltages). Assuming that modulator 101 applies an alternating signal $V_s$ having a relative magnitude of 1.0 to the SIN winding and that modulator 102 applies zero signal to the COS winding, a maximum signal is induced in phase A secondary coil 84 linked by tooth 4 with SIN winding coil 64 when rotor lobe 28 is opposite tooth 4 since the permeance of the magnetic flux path from positive tooth 4 through rotor 27 is a maximum. A minimum signal is induced at this rotor position in phase A secondary coil 90 linked by negative tooth 10 with SIN winding coil 70 since the permeance of the magnetic flux path through tooth 10 is a minimum. Equal and opposite signals are induced in phase A secondary coils 81 and 87 on positive and negative teeth 1 and 7 carrying COS coils since the rotor air-gaps and the permeances of the magnetic flux paths through these teeth are equal and coils 81 and 87 are connected in opposition. The magnitude of the resultant voltage induced in phase A secondary winding may be represented by the vector $VT_s$ in phase with and equal in length to the vector $V_s$ as shown in FIG. 6a.

Figure 6D:
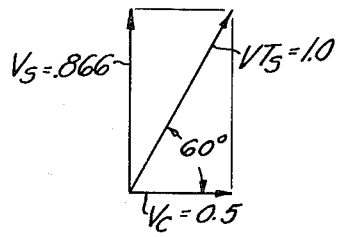
Figure 6C:
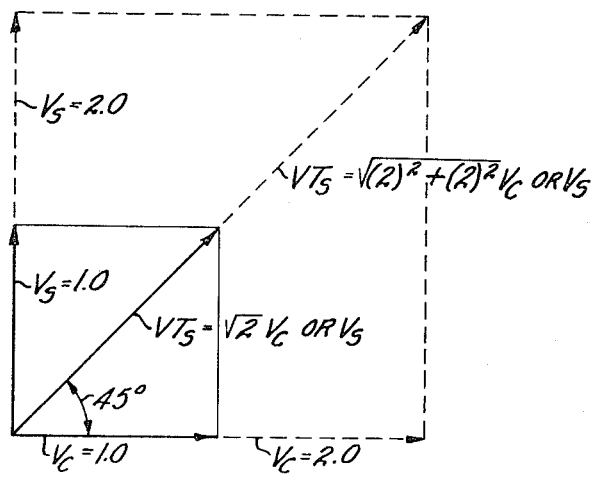

If similarly modulator 102 applies a signal $V_c$ having a relative magnitude of 1.0 to the COS winding and modulator 101 applies zero signal to the SIN winding, the resultant signal induced in phase A secondary winding when rotor lobe 28 is opposite tooth 1 may be illustrated by the vector $VT_s$ as shown in FIG. 6b equal to and in phase with vector $V_c$. If equal signals $V_s$ and $V_c$ having a relative magnitude of 1.0 are applied to the SIN and COS windings, the voltage induced in phase A secondary winding when rotor lobe 28 is positioned midway between teeth 1 and 4 may be represented by the vector $VT_s$ shown in FIG. 6c having a magnitude equal to $\sqrt{2}$ times $V_c$ or $V_s$ and shifted 45° from both. The dotted line vectors in FIG. 6c represent the condition where the signals $V_s$ and $V_c$ supplied by modulators 101 and 102 to the SIN and COS windings are double in magnitude compared to those shown by the full line vectors $v_c=1.0$ and $v_s=1.0$ and illustrate that the resultant signal $VT_s$ induced in phase A secondary winding can be increased, while maintaining the same phase angle, by equally varying $V_s$ and $V_c$. FIG. 6d illustrates that the resultant signal $VT_s$ induced in phase A secondary winding may be shifted through an angle of 60° relative to $V_c$ by energizing the SIN winding with a signal $V_s$ having a relative magnitude of 0.866 and the COS winding with a signal $V_c$ having a relative magnitude of 0.5.

If rotor 27 is coupled through a rotatable shaft 30 directly to the rotor of a two-pole motor 34 as schematically illustrated in FIG. 4, and if fixed magnitude signals $V_s$ and $V_c$ are supplied by modulators 101 and 102 to SIN and COS windings, rotor 27 will sinusoidally vary the permeances of the paths for the magnetic flux induced in teeth 1-12 by primary coils 61-72, thereby sinusoidally modulating the instantaneous voltages $vt_s$ induced in the phase winding secondary coils 81–92 by the magnetic flux in teeth 1–12 at the frequency of rotation of shaft 30. The magnitude of the high frequency voltages induced in the phase A, B and C secondary windings and of the sinusoidal modulation envelopes $VT_s$ may be selectively varied without change of phase angle by adjusting taps on potentiometers 107 and 108 in a fixed ratio to change the magnitude of $V_s$ and $V_c$. The phase angle of the modulation envelopes $VT_s$ of the signals induced in the three-phase secondary windings may be selectively varied by adjusting the relative magnitudes of the signals $V_c$ and $V_s$, and the frequency of the output signals is selectively variable by altering the rotational velocity of shaft 30.

Inasmuch as the output signals $VT_s$ are selectively variable in magnitude, phase, and frequency, it will be appreciated that the disclosed rotary inductor vector adder 59 is particularly suited for controlling exciter, or control means 35 such as a frequency changer shown only in block form but which includes thyristors that regulate supply of electrical power from busses X, Y and Z to synchronous motor 34 to control speed of variable speed motor 34. The phase A, B, and C secondary windings of rotary inductor 59 are shown in FIG. 4 to be connected to motor control means 35 by conductors 95, 96 and 97 coupled to secondary coils 81, 85 and 89 respectively, and these phase A, B and C secondary windings are shown to be connected in wye by conductor 100 connected to one side of coils 90, 82 and 86.

As can be seen in FIG. 4, the polarity each of the signals $V_s$ and $V_c$ to the SIN and COS exciting windings can be reversed by selectively moving the taps of potentiometers 108 and 107, whereby the phase angle may be varied through 360°. Although the embodiment of FIG. 4 has been illustrated as having rotor 27 coupled directly to the two-pole motor 34, it will be appreciated that this embodiment can be utilized with a motor having any desired number of pole-pairs if proper gearing is utilized between the motor and the rotor 27.

A preferred embodiment of the invention is a three-phase, rotary inductor, vector adder having three pole-pairs which finds its principal utility in an adjustable speed system for a three-phase, six-pole synchronous motor directly coupled to the vector adder as disclosed in the copending application of William L. Ringland et al., Ser. No. 824,223, entitled Vehicle Electric Motor Drive System filed May 13, 1969, and having the same assignee as this application, and the motor control system of said application will now be briefly described to provide a background for the preferred embodiment.

Referring to FIG. 7 of the drawing, a synchronous motor 111 has a three-phase armature winding, or stator winding 115 and a field winding 118. A frequency changer, or cycloconverter 126 converts the constant frequency, constant voltage on the three-phase power busses A, B and C into a variable frequency, variable voltage, variable phase alternating current for application to armature winding 115 to regulate the torque and speed of motor 111.

The displacement angle DT between the impressed terminal voltage VT and the excitation voltage ED is caused by the synchronous impedance drop IaZs and is shown in FIG. 9 which is a vector diagram for the adjustable speed synchronous motor system of the aforementioned application Ser. No. 824,223 for rated load at the base speed at the lower limit of the speed range. The displacement angle DT varies from zero at standstill to approximately 90° as shown in FIG. 8 which graphically represents the desired variation in motor terminal voltage magnitude VT and phase angle DT with motor speed to obtain constant output power from the base speed to maximum speed.

In order to keep the rotor poles of motor 111 locked in with the rotating stator poles, the frequency of the terminal voltage impressed on stator winding 115 must at all times be in synchronism with rotor speed, and further the terminal voltage VT must be advanced in phase at all motor speeds by the displacement angle DT shown in FIG. 8. Further the magnitude VT of the terminal voltage impressed on the stator winding 115 must be controlled as a function of motor speed as shown in FIG. 8.

The desired variation in magnitude VT and phase angle DT of the voltage to be applied to stator winding 115 can be expressed graphically by means of a variable parameter curve shown in FIG. 10 in which motor speed is the variable parameter and magnitude VT and phase angle DT are the radius vector and vectorial angle polar coordinates respectively of the curve. A copending application entitled System for Controlling Magnitude and Phase of Terminal Voltage For Adjustable Speed Synchronous Motor, Ser. No. 743,873, filed July 10, 1968, in the name of Thomas P. Gilmore and having the same assignee as this application, discloses a motor control means 106 (shown as a dotted rectangle in FIG. 7) which embodies the present invention and also includes means for deriving first and second alternating signals, termed sine and cosine signals $V_s$ and $V_c$ in accordance with the rectangular coordinates y and x of a curve shown in FIG. 10. Motor control means 106 receives a speed signal over a lead 127 from a tachometer 128 which is proportional to the speed of synchronous motor 111 and includes function generating means 110 shown in block form which derives DC signals proportional to the y and x rectangular coordinates of a curve of FIG. 10 which modulate a high-frequency carrier signal from an oscillator 112 in modulators 113 and 114. The alternating sine and cosine output signals $V_s$ and $V_c$ from modulators 113 and 114 are amplified in power amplifiers 116 and 117 respectively.

Motor control means 106 also receives a power signal from a potentiometer 119 having a movable arm actuated by a power pedal 120 which is proportional to the desired power output level from synchronous motor 111 and varies the magnitude of alternating sine and cosine output signals $V_s$ and $V_c$ as a function of the power signal. Each position of power pedal 120 is represented by a different curve shown in FIG. 10 which graphically plots desired motor terminal voltage magnitude VT and displacement angle DT as polar coordinates. All of such curves are of the same shape, and FIG. 10 illustrates one full line curve designated "Rated Power" corresponding to the fully depressed position of power pedal 120 and a dotted line curve designated "Reduced Power" corresponding to a partially depressed position of power pedal 120.

The preferred embodiment of rotary inductor, vector adder, or angle sensor 121 of the present invention receives the alternating sine and cosine signals $V_s$ and $V_c$ (which are representative of the y and x rectangular coordinates of a curve of FIG. 10) and provides a three-phase output signal for controlling cycloconverter 126 which is a replica in frequency, magnitude and phase angle of the desired terminal voltage VT to be applied to stator winding 115 to keep the poles generated in the motor rotor in synchronism with the stator magnetic poles and to provide constant output power from motor 111 over the speed range. Angle sensor 121 includes first and second primary, or energizing windings SIN and COS, preferably in quadrature, termed sine and cosine windings respectively, which are energized (through relays shown in block form), by the alternating sine and cosine signals $V_s$ and $V_c$ from power amplifiers 116 and 117 in accordance with the rectangular coordinates y and x of a curve of FIG. 10. Angle sensor 121 includes three-phase secondary, or output windings 130X, 130Y and 130Z which are inductively linked to the energizing windings SIN and COS and a ferromagnetic rotor 125 directly coupled to motor 111 which sinusoidally varies the magnetic flux linking the energizing windings SIN and COS and the output windings 130X, 130Y and 130Z as it rotates.

The magnitude of the sinusoidal modulation envelopes $VT_s$ of the high frequency signals induced in output phase windings 130X, 130Y and 130Z vary with motor speed in the manner shown in FIG. 8. The carrier signal is removed from the three-phase output signals $VT_s$ in a ring-type demodulator 122, and the demodulated signals generate (in combination with modified voltages from the phases A, B and C of generator G) gating signals in a firing circuit 123 for controlling the firing of the thyristors of cycloconverter 126 as disclosed in the aforementioned application Ser. No. 824,223.

If angle sensor rotor 125 were held stationary and angle sensor control 106 energized the sine and cosine windings SIN and COS with fixed magnitude, in-phase alternating signals $V_s$ and $V_c$, the 90° displaced sine and cosine windings SIN and COS would generate magnetic fluxes of fixed magnitude which inductively link the three-phase secondary windings 130X, 130Y and 130Z and would induce fixed magnitude signals therein. The permeances of the paths for the magnetic flux generated by the sine and cosine windings SIN and COS (and the voltage level of the fixed magnitude signals induced in the three-phase secondary windings 130X, 130Y and 130Z) is a function of the position of angle sensor rotor 125. When angle sensor rotor 125 rotates, the carrier frequency output voltages $vt_s$ induced in secondary phase windings 130X, 130Y and 130Z are no longer fixed in amplitude but rather have a sinusoidal modulation at a frequency which is a function of the speed of motor 111. The envelopes $VT_s$ of the signals induced in the phase windings 130X, 130Y and 130Z are displaced 120 electrical degrees because of the physical location of these windings on the angle sensor stator 131 as described hereinafter.

Synchronous motor 111 preferably has six poles. Since angle sensor rotor 125 is directly coupled to the rotor of motor 111, angle sensor 121 preferably has three pole-pairs. A preferred embodiment of three-phase, rotary inductor, vector adder, or angle sensor 121 having three pole-pairs suitable for incorporation in the adjustable speed synchronous motor control system of FIG. 7 is illustrated in FIGS. 11–13 and includes an annular stator 131 preferably mounted on the end of the housing (not shown) of motor 111 and comprising a plurality of stacked annular laminations 132 of ferromagnetic material each of which has 36 radially inward extending teeth 133. One primary coil 135, which constitutes a portion of energizing winding SIN or energizing winding COS, and at least one secondary coil 137, which constitutes a portion of one of the secondary phase windings 130X, 130Y and 130Z, surround each tooth 133 and are inductively linked by the ferromagnetic tooth. The primary coils 135 are preferably positioned adjacent the airgap. The permeance of the path for magnetic flux in a tooth 133 (and thus the magnitude of the magnetic flux linking the primary coil 135 and secondary coil 137 surrounding said tooth 133) varies as ferromagnetic rotor 125 having three circumferentially spaced lobes 139 (i.e., the same number as motor 111 has pole-pairs) is turned by motor 111. The lobes 139 have the smallest airgap spacing with teeth 133, and radially inward extending valleys 141 having larger radial spacing from teeth 133 are provided between lobes 139. The magnetic flux through the primary and secondary coils 135 and 137 wound on each tooth 133 is a maximum when a lobe 139 on rotor 125 is opposite said tooth (and the airgap between rotor 125 and tooth 133 is thus a minimum) and is a minimum when a valley 141 between lobes 139 is opposite a tooth 133. Rotor 125 is preferably contoured so that the permeances of the magnetic flux paths through teeth 1–36 and across the airgap into rotor 125 vary substantially sinusoidally over a constant base flux to thus provide sinusoidal variation in the mutual linkage flux through the primary coil 135 and the secondary coil 137 on each tooth 133 as rotor 125 turns.

Primary winding COS may include the serially connected primary coils 135 wound on odd-numbered teeth such as 1, 3, 5, 7, 9 etc., (see FIG. 13) starting on tooth 1 with successive coils 135 wound, or connected, in opposite directions. Primary winding SIN, which is displaced one-half pole-pitch or 90 electrical degrees (30 mechanical degrees) from primary winding COS, may comprise the serially connected primary coils 135 wound on even-numbered teeth such as 4, 6, 8, 10, 12 etc., starting at tooth 4 with successive coils 135 wound, or connected, in opposite directions. Magnetic flux is induced in opposite directions in the teeth on which successive coils of each primary winding are wound, for example, tooth 4 carrying a SIN winding coil 135 is a positive tooth and the magnetic flux is arbitrarily shown as radially outward therein, whereas tooth 6 carrying a SIN winding coil 135 is a negative tooth and the direction of magnetic flux is shown as radially inward.

FIG. 13 is a schematic planar development of the angle sensor stator 131 and rotor 125 and shows lobes 139 opposite teeth 4, 16 and 28. The length of teeth 133 is exaggerated in FIG. 13 and the coils 135 and 137 are shown schematically rather than in their actual position along teeth 133 (for example, the primary coils 135 are shown on the radially inner portion of teeth 133) to facilitate understanding of the coil connections, and only the coils 137 for one-phase secondary winding 130Y and the instantaneous alternating voltages induced in these coils when winding SIN only is energized are shown in relation to the centerline of the lobes 139 of revolving rotor 125. Secondary phase winding 130Y may start with a coil 137 on tooth 1; secondary phase winding 130Z (not shown in FIG. 13) may start with a coil 137 on tooth 5 displaced 120 electrical (40 mechanical) degrees from tooth 1; and secondary phase winding 130X (not shown in FIG. 13) may start with a coil 137 on tooth 9 displaced 120 electrical degrees from tooth 5. Secondary phase 120 130X, 130Y and 130Z are similar, and only phase winding 130Y will be described.

Considering that teeth 1 through 12 constitute one pole-pair, the secondary phase winding 130Y for such pole-pair may comprise the serially connected oppositely energized coils 137 on odd-numbered "cosine" teeth 1 and 7 one pole-pitch (180 electrical degrees) apart starting on tooth 1 with one coil 137 on a positive tooth 1 and the second coil 137 on a negative tooth 7 wound in subtractive relation to each other, connected in series with coils 137 on even-numbered "sine" teeth 4 and 10 one pole-pitch apart starting on tooth 4 (displaced 90 electrical degrees from tooth 1) with one coil 137 on a positive tooth 4 and the other coil 137 on a negative tooth 10 and wound in series opposition. A single pole-pair of secondary phase winding 130Y thus includes a first pair of subtractively energized coils on negative and positive teeth 4 and 10 spaced 180 electrical degrees apart carrying SIN winding coils, connected in series with a second pair of subtractively energized secondary coils 137 on positive and negative cosine teeth 1 and 7 displaced 180 electrical degrees carrying COS winding coils and also displaced 90 electrical degrees from the first pair.

The secondary coils 137 of all three such pole-pairs of phase secondary winding 130Y are connected in series as shown in FIG. 13, i.e., coils 137 on teeth 1, 4, 7 and 10 (which was arbitrarily termed one pole-pair) are connected in series with coils 137 on cosine teeth 13 and 19 and on sine teeth 16 and 22 of a second pole-pair; and also in series with coils 137 on cosine teeth 25 and 31 and on sine teeth 28 and 34 of a third pole-pair.

Assuming that an alternating signal $V_s$ is applied to primary winding SIN and that no signal is applied to primary winding COS, FIG. 13 illustrates several cycles of the instantaneous carrier frequency voltages $v_p$ induced in the secondary coils 137 on positive sine teeth 4, 16 and 28 when the lobes 139 are, as shown, opposite these teeth and also several cycles of the instantaneous carrier frequency voltages $v_n$ induced at this rotor position in secondary coils 137 on negative teeth 10, 22, and 34. FIG. 13 also shows in cross hatching the one-half cycle of instantaneous voltages $v_{ni}$ induced in the coils on negative teeth 10, 22 and 34 which are opposed to and subtract from the one-half cycle of instantaneous voltages $v_{pi}$ (shown in the opposite cross hatching) induced in the coils on positive teeth 4, 16 and 28 to produce the resultant half cycle $vt_s$ shown in checked cross hatching. The sinusoidal modulation envelope $V_4$ of the peak high frequency alternating signals $v_p$ induced in secondary coils 137 of secondary phase winding 130Y on positive teeth 4, 16 and 28 is shown in full lines in FIG. 13; the modulation envelope $V_{10}$ of alternating signals $v_n$ induced in secondary coils 137 on negative sine teeth 10, 22 and 34 is shown in dotted lines; and the sinusoidal modulation envelope $VT_s$ of the resultant high frequency voltage $vt_s$ induced in phase secondary winding 130Y is shown in dot-dash lines.

Since each pole-pair of secondary phase winding 130Y has serially connected coils 137 linking both sine and cosine teeth displaced 90°, the output signal generated by secondary phase winding 130Y when both SIN and COS energizing windings are excited with signals $V_s$ and $V_c$ is the vector sum of such signals. The signals $V_s$ and $V_c$ which excite the SIN and COS windings may be schematically represented by the perpendicular vectors $V_s$ and $V_c$ shown in FIG. 6 (which was described earlier relative to the vector adder embodiment of FIG. 2). Change in position of power pedal 120 (or in speed of motor 111 which varies the output from tachometer 128) varies the ampere turns of the SIN and COS energizing windings and thus may be considered to change the length of the vectors $V_s$ and $V_c$. The output signal induced in secondary phase winding 130Y by equal magnitude signals $V_s=1.0$ and $V_c=1.0$ may be represented by the resultant vector $VT_s$ having a magnitude equal to $\sqrt{2}$ times $V_c$ or $V_s$ and shifted 45° from both as illustrated in FIG. 6c. The dotted line vectors in FIG. 6c represent the condition wherein the signals $V_s$ and $V_c$ to the primary windings SIN and COS are doubled in comparison to those shown by the full line vectors $V_s=1.0$ and $V_c=1.0$ and illustrate that the resultant signal $VT_s$ induced in secondary phase winding 130Y may be increased, while maintaining the same displacement angle DT, by equally varying the signals $V_s$ and $V_c$.

If the energizing winding COS only is excited and zero signal applied to winding SIN, the resultant voltage $VT_s$ induced in secondary phase winding 130Y is proportional to and in phase with the signal $V_c$ exciting the COS winding as shown in FIG. 6b. If zero signal is applied to COS winding and the SIN energizing winding is excited with a signal $V_s$, the resultant voltage $VT_s$ induced in phase secondary winding 130Y is proportional to and in phase with the sine signal $V_s$ as shown in FIG. 6a. FIG. 6d illustrates that the modulation envelope $VT_s$ of the voltage induced in angle sensor phase secondary coil 130Y may be shifted through an angle of 60° by energizing the winding SIN to a relative magnitude of 0.866 and the winding COS to a relative magnitude of 0.5. The modulation envelope $VT_s$ of the resultant signal induced in phase secondary winding 130Y has a magnitude $\sqrt{(0.5)^2+(0.866)^2} = 1.0$ and is displaced 60° from the cosine signal $V_c$.

The magnitude and phase angle of the voltages $VT_s$ induced in angle sensor secondary phase windings 130X, 130Y and 130Z may be changed in magnitude and may also be shifted in phase up to 90° (or up to 360° if the means for deriving $V_s$ and $V_c$ can be reversed in polarity) by altering the relative magnitude of the signals $V_s$ and $V_c$ to the primary windings SIN and COS of rotary inductor, vector adder 121. Inasmuch as the input signal to cycloconverter 126 and the output voltage VT therefrom applied to motor stator winding 115 are controlled by the output signals $VT_s$ from phase secondary windings 130X, 130Y and 130Z, it is possible to control the magnitude VT and phase angle DT of the voltage applied to motor stator winding 115 in accordance with the curves of FIG. 8 by suitable programming of the signals $V_s$ and $V_c$ to the windings SIN and COS as functions of position of power pedal 120 and of the output of tachometer 128 which measures motor speed.

The exciting voltages $V_s$ and $V_c$ applied to the energizing windings SIN and COS of the adjustable speed motor control system of the aforementioned application Ser. No. 824,223 which embodies the preferred embodiment of FIGS. 11–13 are carrier frequency signals selectively variable in magnitude to permit control of motor speed down to zero r.p.m. In alternative adjustable speed motor control systems wherein the lower limit of the speed range is essentially above zero, the carrier frequency may be eliminated and direct current signals $V_s$ and $V_c$ of selectively variable magnitude may excite the energizing windings SIN and COS. The three-phase, rotary inductor, vector adder for such motor control system using DC exciting signals $V_s$ and $V_c$ is simpler than the embodiment utilizing alternating exciting signals, and FIG. 14 is a schematic planar development of one pole-pair of the 36 tooth ferromagnetic stator 136 and windings of such embodiment using DC exciting signals.

Like elements of alternative embodiments of the invention are given the same reference numerals, and elements which are similar to, but differ slightly from, the elements of the embodiment of FIGS. 11–13 are given the same reference numerals with the addition of the prime designation. Since the exciting signals $V_s$ and $V_c$ are not alternating, no magnetic flux changes occur in the stator teeth 1–36 when rotor 125 is at standstill and no output signals are induced in the three-phase secondary phase windings 130X', 130Y' and 130Z'. The only signals generated in the secondary phase windings are induced as a result of flux variations caused by the contour of rotating ferromagnetic rotor 125. Since no voltages are induced as a result of alternation of the energizing signals, no voltages are generated in the secondary phase windings as a result of the "base" flux linking the secondary coils, and it consequently is unnecessary to connect two secondary coils in series opposition on positive and negative teeth in order to nullify the effect of the base flux as required in the preferred embodiment of FIGS. 11–13. Consequently only one-half as many primary coils 135 and secondary coils 137 are required in the embodiment of FIG. 14 having direct current exciting signals as in the embodiment of FIGS. 11–13.

The coils 135 of the primary winding COS may be on every fourth even-numbered tooth such as 4, 8, 12, 16 etc., and the coils 135 of the primary winding SIN may be on every fourth odd-numbered tooth such as 1, 5, 9, 13 etc. (preferably being adjacent the airgap rather than radially inward as shown). In this embodiment all of the teeth 1, 5, 9, 13 etc. and 4, 8, 12 etc. carrying primary coils 135 shown in full lines are positive teeth and the magnetic flux returns through the teeth 2, 3, 6, 7, 10, 11 etc. which carry no coils. In order to force the return flux into definite paths, it is preferable that primary coils 135' also be provided on teeth 2, 3, 6, 7, 10, 11 etc. as shown in dotted lines. However, in an angle sensor having an even number of pole-pairs, it is possible to eliminate both the coils 135' shown in dotted lines and the teeth 2, 3, 6, 7, 10 and 11 by proper connection of the primary coils 135. Secondary phase winding 130X' may comprise serially connected coils 137 on one sine tooth and one cosine tooth of the first pole-pair such as teeth 1 and 4, connected in series with coils 137 on one sine tooth 13 and one cosine tooth 16 of the second pole-pair (not shown), connected in series with coils 137 on one sine tooth 25 and on one cosine tooth 28 of the third pole-pair (not shown). Similarly secondary phase winding 130Y' may be displaced 120 electrical degrees from phase winding 130X' and comprise serially connected coils 137 on sine tooth 5 and on cosine tooth 8 of the first pole-pair, connected in series with coils 137 on one sine tooth 17 and one cosine tooth 20 of the second pole-pair (not shown), and in series with coils 137 on one sine tooth 29 and one cosine tooth 32 of the third pole-pair (not shown). Secondary phase winding 130Z' similarly includes serially connected coils 137 on sine teeth 9, 21 and 33 and on cosine teeth 12, 24 and 36. It will be noted that no secondary coils surround 18 teeth such as teeth 2, 3, 6, 7, 10, 11, 14 etc.

Contrary to the previously described alternating current embodiments, it should be noted that the voltages induced in the coils 137 of the direct current embodiment of FIG. 14 are a maximum, not at the position where the permeance is a maximum when the rotor lobe is opposite a tooth, but rather at 90 electrical degrees away when the rate of change of the airgap is a maximum. A voltage component caused by rotation if the rotor only is also present in the previously described AC embodiments, but such component can be disregarded when the AC excitation frequency is essentially higher than the rotational frequency, for example, when the signals $V_c$ and $V_s$ are modulated at 10 kilocycles and the motor rotational velocity is in the range of 0 to 250 cycles per second.

The preferred embodiment of FIGS. 11-13 has alternating sine and cosine teeth at 10 degree intervals with the sine teeth located in the "magnetic neutral" zone of the cosine teeth, and vice versa. Because of the varying permeances of the airgaps formed by rotor 125 with the teeth 133, some mutual influence exists between the magnetic flux fields generated by the primary coils 135 on the sine and cosine teeth. FIG. 15 illustrates a three-phase, rotary inductor, vector adder embodiment of the invention similar to the embodiment of FIGS. 11-13 but which eliminates such mutual influence between sine and cosine teeth. A first laminated annular ferromagnetic stator 150 preferably has 18 radial sine teeth 151 carrying the primary coils 135 of energizing winding SIN and is axially displaced from a second laminated annular ferromagnetic stator 153 which has 18 cosine teeth 154 carrying the primary coils 135 of energizing winding COS.

Three 120° displaced secondary phase windings are provided in a manner similar to the embodiment of FIGS. 11-13 with each phase winding including secondary coils 137 on sine teeth 151 connected in series with secondary coils 137 on cosine teeth 154. Each pole-pair of each secondary phase winding has a pair of serially connected secondary coils 137 on a pair of 180° arcuately displaced positive and negative sine teeth 151, connected in series with a pair of serially connected secondary coils 137 on a pair of 180° arcuately displaced positive and negative cosine teeth 154 arcuately displaced 90 electrical degrees from the sine teeth 151. The 120° angular displacement between the three secondary phase windings is provided by the circumferential displacement of the secondary coils 137 on teeth 151 and 154 in a manner analogous to the embodiment of FIGS. 11-13.

Ferromagnetic rotors 125' and 125" of silicon steel laminations each having three axially aligned lobes 139 (similar to the rotors 125 of the embodiment of FIGS. 11-13) are rotatable within stator 150 and 153 respectively. Alternatively, the secondary coils 137 on sine and cosine teeth 151 and 154 of a given pole-pair of a secondary phase winding can be axially aligned and the lobes 139 on the rotors 125' and 125" associated with the SIN and COS windings can be arcuately displaced 90°. It will be appreciated that this embodiment substantially reduces the mutual magnetic influence between the magnetic fields generated by the primary windings SIN and COS and thus minimizes undesirable harmonic components in the sinusoidally modulated output voltage VT$_s$ generated in the secondary phase windings.

The physical size and effectiveness of a rotary inductor embodying the invention is dependent to a large extent upon an airgap of minimum dimension between the rotor and the stator teeth. The degree of concentricity between rotor and stator determines the minimum airgap, and even a high degree of concentricity may be nullified after use by wear and by expansion of the components as a result of heating by the motor 111. FIG. 16 illustrates a very compact embodiment having an extremely small rotor-to-teeth airgap wherein the rotor 125 is affixed directly to an extension 162 of the motor shaft, and the angle sensor housing 163 carrying the stator 131 provided with radially inward extending teeth 133 is supported on bearings 167 having inner races 168 engaging shaft extension 162. Angle sensor housing 163 may be anchored to the motor housing 169 by relatively flexible means shown as a stud 171 and is made self-aligning on shaft extension 162 by bearing 167, thereby assuring a high degree of concentricity between rotor and stator and the advantages of a self-centered assembly. These advantages may also be obtained when angle sensor housing 163 is mounted by bearings 167 on a separate shaft (not shown) operatively connected by a flexible but torque-stiff coupling or by suitable gearing to the motor rotor, and the latter arrangement permits the same angle sensor to be utilized with motors having different numbers of pole-pairs.

FIG. 17 illustrates an embodiment of the invention wherein the energizing windings SIN and COS are positioned on approximately diametrically opposed portions of the stator to reduce the mutual influence therebetween and to reduce the number of teeth and coils. This embodiment also illustrates rotary inductor, vector adders wherein the two oppositely connected coils associated with each secondary winding, which cancel the voltages generated by the base flux, are on teeth displaced by an angle other than 180 electrical degrees.

FIG. 17 is a planar development of a stator 160 preferably comprised of annular ferromagnetic laminations having 18 radially inward extending teeth 1-18, and only the secondary phase winding 130Y" for one phase is shown.

Energizing winding SIN may comprise the primary coils 135 on six successive teeth 12, 11, 10, 9, 8 and 7 spaced 20° (mechanical) apart with successive coils wound, or connected, in opposite directions so that teeth 12, 10 and 8 are positive teeth and teeth 11, 9 and 7 are negative teeth. Energizing winding COS may comprise the primary coils 135 on six teeth 6, 4, 2, 18, 16 and 14 spaced 40° (mechanical) apart with successive coils wound in opposite directions so that teeth 6, 2 and 16 are positive teeth and teeth 4, 18 and 14 are negative teeth (preferably the primary coils 135 are adjacent the airgaps rather than on the radially inner portion of the teeth as shown). Secondary phase winding 130Y" may comprise coils 137 on positive and negative cosine teeth 2 and 18 connected in series opposition, connected in series with coils 137 on positive and negative sine teeth 10 and 7 wound in subtractive relationship.

The secondary coils 137 on positive and negative sine teeth 10 and 7 are displaced 60 mechanical, or 180 electrical degrees and thus cancel voltages induced therein by the base component of the magnetic flux.

FIG. 17 shows the sinusoidal variation in permeances P of the magnetic flux paths through the airgaps between rotor 125 and teeth 1-18. This figure also shows the (demodulated) resultant sinusoidal modulation envelope VT$_{SIN}$ of the high frequency voltages induced in the coils on positive and negative sine teeth 7 and 10, plotted relative to the centerline of tooth 10, and it will be noted that the resultant voltage VT$_{SIN}$ is zero when the permeances of the flux paths through teeth 7 and 10 are equal and the permeance of the airgap on the resultant centerline between coils 137 on sine teeth 7 and 10 is a minimum, i.e., when a rotor valley 141 between the lobes 139 is opposite the resultant centerline between teeth 7 and 10.

FIG. 17 also shows that the (demodulated) resultant signal VT$_{COS}$ (plotted with reference to the centerline on tooth 2) generated in opposed secondary coils 137 on 120° (electrical) displaced positive and negative cosine teeth 2 and 18 is shifted 60 electrical degrees from the position wherein the airgap permeance opposite the centerline between teeth 2 and 18 (i.e., on the centerline of tooth 1) has the base value (i.e., when a valley 141 is opposite tooth 1). This figure further illustrates that the magnitude of the resultant signal VT$_{COS}$ is smaller than (i.e., SIN 60°=0.866) that of the signal VT$_{SIN}$ (assuming equal signals V$_s$ and V$_c$ applied to SIN and COS windings and equal coil turns) because of the 120° displacement between positive and negative cosine teeth 2 and 18 carrying coils 137 of secondary phase winding 130Y". Such reduction in the magnitude of signal VT$_{COS}$ can be compensated for, if desired, by increase in the magnitude of the exciting signal V$_c$ relative to signal V$_s$ or by changing the turn ratio between primary and secondary coils 135 and 137 on the cosine teeth.

It will be appreciated that SIN and COS energizing windings are displaced 90 electrical degrees because the centerline between positive and negative cosine teeth 2 and 18 (i.e., at tooth 1) is displaced 210° mechanical, or 90° electrical (720° minus 630°) from the centerline between positive and negative sine teeth 10 and 7. Consequently the resultant signal VT$_s$ (not shown) induced in secondary winding 130Y" may be considered the resultant of two perpendicular vectors V$_s$ and V$_c$ whose length is representative of the magnitude of the two signals applied to the energizing windings SIN and COS. As illustrated in FIG. 17, six teeth 1, 3, 5, 13, 15, 17 carry no coils, but it will be appreciated that such teeth could be used for a second arrangement of cosine coils to provide additional output signals, for example, to indicate rotor position (e.g., $E_D$) or motor speed.

FIG. 18 is a planar development of the windings on an annular ferromagnetic stator 170 of an alternative embodiment of rotary inductor, vector adder for controlling an electric motor directly coupled thereto having $n$ phases and $p$ poles, and this figure of the drawing shows $n=3$ and $p=6$ and omits the rotor 125 having $p12$ lobes 139 with valleys between the lobes which rotates within the stator 170 and illustrates the primary coils on the radially inner portion of the teeth rather than the preferred position on the radially outer portion of the teeth. In the embodiment of FIG. 18 the teeth encircled by the coils 135 of the SIN energizing winding are diametrically displaced from the teeth encircled by the coils 135 of the COS energizing winding to eliminate or minimize the mutual influence between the magnetic flux fields generated by the SIN and COS windings. The stator 170 requires only $4n$ equals 12 teeth, but stator 170 preferably has 18 teeth 1–18 to separate the teeth 7–12 carrying primary coils 135 of energizing winding SIN a maximum distance from the teeth 16, 17, 18, 1, 2, 3 carrying primary coils 135 of energizing winding COS and to provide a structure which is symmetrical about the axis of rotation. Thus no coils are wound on teeth 4–6 and teeth 13–15 which are positioned between the sine and the cosine teeth. The primary coils 135 of the winding SIN are wound on teeth 7–12 so that the magnetic fluxes are in opposite direction in successive teeth, and similarly the primary coils 135 of winding COS are wound on teeth 16, 17, 18, 1, 2, 3 so that the magnetic fluxes are in opposite directions in successive teeth.

In the embodiment of FIG. 18, one primary coil 135 and two secondary coils 137 surround each tooth 1–3, 7–12 and 16–18. The coils 137 of phase A output winding are shown cross hatched in one direction, the coils 137 of phase B output winding are shown with the opposite cross hatching, and the coils 137 of phase C output with checked hatching. Phase B output winding may include the secondary coils 137 on the following teeth connected in series in the following sequence starting from the neutral 172: negative sine tooth 10, positive sine tooth 7, positive sine tooth 7, negative sine tooth 10, negative cosine tooth 3, positive cosine tooth 18, negative cosine tooth 17 and positive cosine tooth 2. The two additive secondary coils 137 on negative sine tooth 10 are connected in subtractive relation with the two additive coils 137 on positive sine tooth 7 which is displaced 180 electrical degrees from tooth 10; the secondary coil 137 on negative cosine tooth 3 is connected in subtractive relation with the coil 137 on positive cosine tooth 18 which is displaced 180 electrical degrees from tooth 3; and the secondary coil 137 on negative cosine tooth 17 is connected in subtractive relation with the coil 137 on positive cosine tooth 2 which is displaced 180 electrical degrees from tooth 17, thereby nullifying the base flux. The centerline between sine teeth 7 and 10 occurs midway between teeth 8 and 9 and is displaced 450 equals 90 electrical degrees from the resultant centerline for cosine teeth 3–18 and 2–17 which occurs at tooth 1. Consequently the output signal induced in phase output winding B is the vector sum of the $V_s$ and $V_c$ signals applied to SIN and COS energizing windings displaced 90 electrical degrees apart.

The phase A and phase C output windings are displaced $360/n$ equals 120 electrical degrees from the phase B output winding e.g., the phase A secondary coils 137 on positive and negative sine teeth 9 and 12 are displaced (40 mechanical) 120 electrical degrees from the phase B secondary coils 137 on positive and negative sine teeth 7 and 10, etc. It will be noted that each of the cosine teeth 16–18 and 1–3 carries both a secondary coil 137 of one phase output winding and a secondary coil 137 from a different phase output winding. For example, positive cosine tooth 17 carries a coil 137 from the phase B output winding and a coil 137 from phase A output winding.

In order to compensate for differences in fringing and stray flux effects (outside teeth versus inside teeth or differences in location of secondary coils on the teeth), the ratio of turns between primary and secondary coils, or between secondary-to-secondary coils, may be varied as desired.

While only a few embodiments of the invention have been illustrated and described, many modifications and variations thereof will be readily apparent to those skilled in the art. In alternative embodiments not disclosed the toothed stator carrying the windings is radially inward from an annular rotor, while in still other embodiments the rotor is circular and has portions of different permeability or skewed segmented laminations to obtain the desired sinusoidal variation in permeances of the magnetic flux paths. Consequently it is intended in the appended claims to cover all such modifications and variations which are within the true spirit and scope of the invention.

We claim:

1. A polyphase rotary inductor vector adder having $n$ phases where $n$ is an integer greater than two comprising, in combination, a ferromagnetic stator having $n$ angularly displaced first teeth and $n$ angularly displaced second teeth, said first teeth being angularly displaced from said second teeth, a first energizing winding having serially connected turns surrounding each of said first teeth, a second energizing winding having serially connected turns surrounding each of said second teeth, and $n$ phase output windings each of which has turns surrounding one of said first teeth connected in series with turns surrounding one of said second teeth which one first and one second tooth are displaced by multiples of $360/n$ electrical degrees from the first and second teeth surrounded by the turns of the other phase output windings, and ferromagnetic rotor means disposed adjacent said stator in spaced confronting relation with said teeth and being separated therefrom by a magnetic reluctance gap and being rotatable within said stator for modulating the permeances of the magnetic flux paths which extend through said teeth and across the gap into said rotor means.

2. A vector adder in accordance with claim 1 wherein said stator has $2n$ first teeth and $2n$ second teeth and said first energizing winding has serially connected turns surrounding each of said first teeth so that the magnetic fluxes flow in opposite directions in successive first teeth and said second energizing winding has serially connected turns surrounding each of said second teeth so that the magnetic fluxes flow in opposite directions in successive second teeth and each said phase output winding has turns surrounding each of a pair of said first teeth connected in subtractive relation and turns surrounding each of a pair of said second teeth connected in subtractive relation and also connected in series with said turns surrounding said pair of first teeth.

3. A rotary inductor in accordance with claim 1 wherein said first teeth are displaced $360/n$ electrical degrees apart and said second teeth are displaced $360/n$ electrical degrees apart and also displaced 90 electrical degrees from said first teeth.

4. A polyphase rotary inductor, vector adder having $n$ phases where $n$ is an integer greater than two comprising, in combination, a ferromagnetic stator having at least $4n$ radially extending, angularly displaced teeth $2n$ of which are first teeth and $2n$ of which are second teeth, a first energizing winding having turns surrounding each of said first teeth connected in series, a second energizing winding having turns surrounding each of said second teeth connected in series, $n$ secondary phase output windings each of which has turns surrounding each of one pair of said first teeth connected in subtractive relation and turns surrounding each of one pair of said second teeth connected in subtractive relation and also connected in series with said turns surrounding said first teeth, said one pair of first and one pair of second teeth surrounded by turns of each output phase windings being displaced by multiples of $360/n$ electrical degrees from the corresponding pairs of first and second teeth surrounded by the turns of the other phase output windings, and ferromagnetic rotor means rotatable relative to said stator and disposed adjacent said stator in spaced confronting relation with said teeth and separated therefrom by a magnetic reluctance gap for cyclically modulating the permeances of the magnetic flux paths which extend through said teeth and across said gap into said rotor means as it rotates.

5. A rotary inductor vector adder in accordance with claim 4 wherein $n$ is three and said teeth are all in a common plane and displaced 30 electrical degrees apart, said first teeth are odd-numbered teeth, and said second teeth are even-numbered teeth and disposed between said first teeth.

6. A polyphase rotary inductor vector adder in accordance with claim 4 wherein said one pair of first teeth are angularly displaced 90 electrical degrees from said one pair of second teeth and said pair of first teeth are angularly displaced 180 electrical degrees apart and said pair of second teeth are angularly displaced 180 electrical degrees apart.

7. A rotary inductor vector adder in accordance with claim 4 wherein said first teeth are all on the same portion of said stator and said second teeth are all on a different portion of said stator.

8. A rotary inductor vector adder in accordance with claim 4 wherein the turns of said first energizing winding are wound to generate magnetic fluxes in opposite directions in successive first teeth and the sum of the instantaneous magnetic fluxes in all of said first teeth is zero and the turns of said second energizing winding are wound to generate magnetic fluxes in opposite directions in successive second teeth and the sum of the instantaneous magnetic fluxes in all of said second teeth is zero, and wherein the permeances of said magnetic flux paths which extend through said teeth and across the gap into said rotor means vary substantially sinusoidally.

9. A polyphase rotary inductor vector adder in accordance with claim 4 wherein said ferromagnetic stator is annular and said teeth project radially inward and said ferromagnetic rotor means includes a rotor rotatable within said stator having a lobe with the smallest gap to said teeth and wherein the permeances of the magnetic flux paths through said teeth and across the gap into said rotor vary substantially sinusoidally.

10. A rotary inductor vector adder in accordance with claim 4 wherein said stator includes first and second axially spaced annular ferromagnetic stator members, said first teeth are on said first stator member and said second teeth are on said second stator member and are angularly displaced 90 electrical degrees from said first teeth, and said ferromagnetic rotor means includes first and second rotors rotatable within said first and second stators respectively and each of which has a lobe with the smallest gap to said stator teeth and wherein the permeances of the magnetic flux paths through said teeth on each of said first and second stator members and across the gap into the corresponding rotor vary substantially sinusoidally.

11. A polyphase rotary inductor vector adder for controlling an electric motor having $n$ phases and $p$ poles where $n$ is an integer greater than 2 and $p$ is an even-numbered integer greater than two comprising, in combination, an annular ferromagnetic stator having at least $4n$ angularly displaced, radially projecting teeth around its periphery, at least $2n$ of said teeth constituting first teeth and at least $2n$ of said teeth constituting second teeth and being angularly displaced from said first teeth, a first energizing winding having turns surrounding each of said first teeth connected in series so that the magnetic fluxes are in opposite directions in successive first teeth and the sum of the instantaneous magnetic fluxes therein is zero, a second energizing winding having turns surrounding each of said second teeth connected in series so that the magnetic fluxes are in opposite directions in successive second teeth and the sum of the instantaneous magnetic fluxes therein is zero, $n$ phase output windings each of which has turns surrounding each of one pair of said first teeth connected in subtractive relation and turns surrounding each of one pair of said second teeth connected in subtractive relation and also connected in series with said turns surrounding said first teeth, said one pair of first and one pair of second teeth being displaced by multiples of $360/n$ electrical degrees from the corresponding pairs of first and second teeth surrounded by turns of the other phase output windings, and ferromagnetic rotor means disposed adjacent said stator in confronting relation to said teeth and being spaced therefrom by a magnetic reluctance gap and being rotatable relative to said stator for cyclically modulating the permeances of the magnetic flux paths extending through said teeth and across said gap into said rotor means as it rotates, said rotor means having $p/2$ angularly displaced portions at which the permeance of the flux path through a tooth is a minimum when said portion is opposite thereto.

12. A rotary inductor vector adder in accordance with claim 11 wherein $p$ is an even-numbered integer greater than 4 and said teeth extend radially inward, said rotor means includes a ferromagnetic rotor having $p/2$ angularly displaced lobes with the smallest gap to said teeth and valleys between said lobes, the permeances of the magnetic flux paths through said teeth and across the gap into said rotor varying substantially sinusoidally.

13. A rotary inductor vector adder in accordance with claim 12 wherein said one pair of first teeth is displaced 90 electrical degrees from said one pair of second teeth and said one pair of first teeth are displaced 180 electrical degrees apart and said one pair of second teeth are displaced 180 electrical degrees apart.

14. A rotary inductor vector adder in accordance with claim 11 having $p/2$ pole-pairs each of which includes $2n$ first teeth and $2n$ second teeth and each said phase output winding has, in each pole-pair, turns surrounding each of one pair of said first teeth of said pole-pair connected in subtractive relation and turns surrounding each of one pair of said second teeth of said pole-pair connected in subtractive relation and connected in series with said turns surrounding said one pair of first teeth with all of said turns of said $p/2$ pole-pairs being connected in series to form said phase output winding.

15. A rotary inductor vector adder in accordance with claim 14 wherein said teeth extend radially inward, said rotor means includes a ferromagnetic rotor having $p/2$ angularly displaced lobes with the smallest gap to said teeth and valleys between said lobes, the permeances of the magnetic flux paths through said teeth and across the gap into said rotor varying substantially sinusoidally, said first teeth and said second teeth are disposed alternately, and said one pair of first teeth is angularly displaced 90 electrical degrees from said one pair of second teeth.

16. A rotary inductor vector adder in accordance with claim 11 wherein said $2n$ first teeth are successive teeth and said $2n$ second teeth are successive teeth and are disposed on said stator approximately diametrically opposite said first teeth to minimize the interaction of the magnetic fluxes flowing in said first teeth with the magnetic fluxes flowing in said second teeth.

17. A rotary inductor vector adder in accordance with claim 11 wherein the periphery of said stator defines $p/2$ times 360 electrical degrees and said $2n$ first teeth are successive and extend around 360 electrical degrees of said stator and the centerline between said one pair of first teeth is effectively displaced by 90 electrical degrees from the centerline between said one pair of second teeth.

18. A polyphase rotary inductor vector adder for controlling an electric motor having $n$ phases and $p$ poles where $n$ is an integer greater than two and $p$ is an even-numbered integer greater than four comprising, in combination, an annular ferromagnetic stator having at least $n$ times $p$ angularly displaced, radially projecting teeth around its periphery, one half of said teeth constituting first teeth and one half of said teeth constituting second teeth, said stator defining $p/2$ times 360 electrical degrees and $p/2$ pole-pairs and each pole-pair constituting $n$ first teeth angularly displaced $360/n$ electrical degrees apart and $n$ second teeth angularly displaced $360/n$ electrical degrees apart and said second teeth being angularly displaced from said first teeth of said pole-pair, a first energizing winding having turns surrounding each of said first teeth connected in series, a second energizing winding having turns surrounding each of said second teeth connected in series, $n$ phase output windings each of which has serially connected turns surrounding one first tooth in each pole-pair connected in series with turns surrounding one second tooth in said pole-pair, and ferromagnetic rotor means disposed adjacent said rotor in confronting relation to said teeth and being spaced therefrom by a magnetic reluctance gap and being rotatable relative to said stator for cyclically modulating the permeances of the magnetic flux paths extending through said teeth and across said gap into said rotor means as it rotates and also having $p/2$ angularly displaced portions at which the permeance of a flux path through a tooth is a minimum when said portion is opposite thereto.

19. A rotary inductor vector adder in accordance with claim 18 wherein said teeth extend radially inward and said rotor means includes a ferromagnetic rotor having $p/2$ angularly displaced lobes with the smallest gap to said teeth and valleys between said lobes and the permeances of said magnetic flux paths through said teeth and across the gap into said rotor vary substantially sinusoidally.

20. A vector adder in accordance with claim 18 where $p/2$ is an odd number and said stator has at least $2n$ times $p$ teeth and each pole-pair constitutes $2n$ first teeth and $2n$ second teeth and the turns of said first energizing winding individually surround said first teeth in each pole-pair so that the magnetic fluxes flow in opposite directions in successive first teeth and the turns of said second energizing winding individually surround said second teeth in each pole-pair so that the magnetic fluxes flow in opposite directions in successive second teeth.

21. A rotary inductor vector adder comprising, in combination, an annular ferromagnetic stator having a pair of radially inward projecting first teeth which are angularly displaced 180 electrical degrees from each other and a pair of radially inward projecting second teeth which are angularly displaced 180 electrical degrees from each other and also angularly displaced 90 electrical degrees from said first teeth, a first energizing winding having serially connected turns surrounding each of said pair of first teeth to induce magnetic fluxes in said first teeth when current is passed through said first energizing winding, a second energizing winding having serially connected turns surrounding each of said pair of second teeth to induce magnetic fluxes in said second teeth when current is passed through said second energizing winding, an output winding having turns surrounding each of said pair of first teeth connected in subtractive relation and turns surrounding each of said pair of second teeth connected in subtractive relation and also connected in series with said turns surrounding said first teeth to vectorially add the voltages induced in said turns surrounding said first teeth and said turns surrounding said second teeth, and ferromagnetic rotor means rotatable within said stator and separated from said teeth by a magnetic reluctance gap for cyclically modulating the permeances of the magnetic flux paths extending through said teeth and across said gap into said rotor as it rotates within said stator to cyclically modulate the output signal from said output winding.

22. A rotary inductor vector adder in accordance with claim 1 wherein said stator has $2n$ first and $2n$ second teeth, said first energizing winding has serially connected turns surrounding each of said first teeth, said second energizing winding has serially connected turns surrounding each of said second teeth, and each phase output winding has turns surrounding each of a pair of said first teeth angularly displaced 180 electrical degrees connected in subtractive relation and turns surrounding each of a pair of said second teeth angularly displaced 180 electrical degrees connected in subtractive relation and wherein said first teeth are angularly displaced 90 electrical degrees from said second teeth.

* * * * *